United States Patent
Goto

(10) Patent No.: US 12,525,128 B2
(45) Date of Patent: Jan. 13, 2026

(54) DRIVER ASSISTANCE SYSTEM, VEHICLE, AND RECORDING MEDIUM RECORDING COMPUTER PROGRAM

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 18/561,272

(22) PCT Filed: Apr. 28, 2022

(86) PCT No.: PCT/JP2022/019264
§ 371 (c)(1),
(2) Date: Nov. 15, 2023

(87) PCT Pub. No.: WO2023/209942
PCT Pub. Date: Nov. 2, 2023

(65) Prior Publication Data
US 2024/0233549 A1 Jul. 11, 2024

(51) Int. Cl.
*G08G 1/16* (2006.01)
*G08G 1/09* (2006.01)

(52) U.S. Cl.
CPC ............. *G08G 1/166* (2013.01); *G08G 1/09* (2013.01); *G08G 1/16* (2013.01)

(58) Field of Classification Search
CPC ............. G08G 1/166; G08G 1/09; G08G 1/16
See application file for complete search history.

(56) References Cited

U.S. PATENT DOCUMENTS

2012/0010762 A1  1/2012  Asano
2018/0292834 A1  10/2018  Kindo
(Continued)

FOREIGN PATENT DOCUMENTS

EP    3048021 A1    7/2016
JP    2010-224762 A    10/2010
(Continued)

OTHER PUBLICATIONS

International Search Report received in International Application No. PCT/JP2022/019264, dated May 31, 2022 w/English MT.

*Primary Examiner* — Rodney A Butler
(74) *Attorney, Agent, or Firm* — Rimon P.C.

(57) ABSTRACT

A driver assistance system that assists driving of a vehicle acquires first behavior data that is behavior data of the first mobile body detected by an environment recognition device provided separately from the first mobile body different from the vehicle, acquires second behavior data that is behavior data of a second mobile body present on a route on which the first mobile body is scheduled to travel and including a communication means for sending own behavior data to the vehicle to assist, and predicts, when the first mobile body is no longer detected by the environment recognition device after first time when the first mobile body is, the collision between the first mobile body and the vehicle to assist, based on the first behavior data of the first mobile body acquired before the first time, and the second behavior data acquired from the communication means of the second mobile body.

12 Claims, 20 Drawing Sheets

(56) References Cited

U.S. PATENT DOCUMENTS

| | | | |
|---|---|---|---|
| 2022/0046381 A1* | 2/2022 | Ong | H04W 4/022 |
| 2022/0262251 A1* | 8/2022 | Nakagawa | G08G 1/161 |
| 2025/0058773 A1* | 2/2025 | Takekawa | B60W 30/0956 |

FOREIGN PATENT DOCUMENTS

| | | | |
|---|---|---|---|
| JP | 2016-139163 A | 8/2016 | |
| JP | 2018-124663 A | 8/2018 | |
| JP | 2018-176879 A | 11/2018 | |
| JP | 2020-166510 A | 10/2020 | |
| JP | 2021-111344 A | 8/2021 | |

\* cited by examiner

DRIVER ASSISTANCE SYSTEM, VEHICLE, AND RECORDING MEDIUM RECORDING COMPUTER PROGRAM

CROSS-REFERENCE TO RELATED APPLICATIONS

This application is the U.S. National Phase under 35 U.S.C. § 371 of International Application No. PCT/JP2022/019264, filed on Apr. 28, 2022.

TECHNICAL FIELD

The disclosure relates to a driver assistance system, a vehicle, and a recording medium recording a computer program.

BACKGROUND ART

As a technique to avoid an accident at an intersection where vehicles encounter each other, a technique is known that notifies one or more vehicles entering the intersection of a warning using an inter-vehicle communication means or a road-to-vehicle communication means and avoids a collision between vehicles by controlling automatic driving of the vehicles. However, the existing technique fails to operate appropriately when any of the vehicles is not provided an inter-vehicle communication function or when the intersection is not provided with a road-to-vehicle communication function.

To address this, Patent Literature 1 discloses a technique to avoid an accident with a vehicle not provided with the inter-vehicle communication means or the like at an intersection. In Patent Literature 1, an information provision apparatus is disclosed that provides information on a mobile body without the inter-vehicle communication function which is predicted to approach a vehicle with the inter-vehicle communication function on a path on which the vehicle with the inter-vehicle communication function is traveling to an occupant of the vehicle with the inter-vehicle communication function. Specifically, Patent Literature 1 proposes the information provision apparatus that sends own vehicle information, mobile body information on a position, a traveling speed, and a traveling direction of a mobile body, and time of acquisition of the information to a base station. The information provision apparatus receives predicted information on the mobile body present within a predetermined range including the own vehicle position determined by the base station, and provides the information to the occupant of the own vehicle.

CITATION LIST

Patent Literature

Patent Literature 1: Japanese Unexamined Patent Application Publication No. 2010-224762

SUMMARY OF INVENTION

Problem to be Solved by the Invention

In Patent Literature 1, the base station estimates the probability of existence of the mobile body without the inter-vehicle communication function at a predetermined position based on an elapsed time after the detection of the mobile body, estimates the probability of existence of the mobile body at the predetermined position based on the distance from a position where the mobile body is detected to the predetermined position, and estimates the probability of existence of the mobile body at the predetermined position based on road branch information in map data.

However, with the technique of Patent Literature 1, the estimated arrival time of the mobile body at the predetermined position can diverge from actual arrival time when a circumstance arises where the mobile body is unable to continue traveling, such as when the mobile body is forced to decelerate by a pedestrian crossing a road in front of the mobile body in the time from acquisition of the latest information on the mobile body to the arrival of the mobile body at the predetermined position, for example. In this case, unbeneficial information can be provided to the driver.

The problem is not limited to the mobile body without the inter-vehicle communication function, and a similar problem can arise in a bad communication environment or upon a malfunction of a communication system even though the mobile body is provided with the inter-vehicle communication function.

The disclosure has been made in view of the problem described above, and an object of the disclosure is to provide a driver assistance system, a vehicle, and a recording medium recording a computer program each of which makes it possible to reduce a risk of an accident between a vehicle to assist and a first mobile body unable to send own behavior data to the vehicle to assist at an intersection.

Means for Solving the Problem

To solve the above-described problem, according to an aspect of the disclosure, a driver assistance system that assists driving of a vehicle is provided. The driver assistance system includes one or more processors, and one or more memories communicably coupled to the one or more processors. The one or more processors are configured to acquire first behavior data directly or via an external server from an environment recognition device. The first behavior data is behavior data of a predetermined first mobile body detected by the environment recognition device provided separately from the first mobile body. The first mobile body is different from the vehicle to assist. The one or more processors are configured to acquire second behavior data. The second behavior data is behavior data of a second mobile body present on a route on which the first mobile body is scheduled to travel and includes a communication means for sending own behavior data directly or via the external server to the vehicle to assist. The one or more processors are configured to, when the first mobile body having been detected by the environment recognition device is no longer detected by the environment recognition device after first time when the first mobile body is last detected by the environment recognition device, predict a collision between the first mobile body and the vehicle to assist, based on the first behavior data of the first mobile body acquired before the first time, and the second behavior data acquired from the communication means of the second mobile body.

In addition, to address the above-described problem, according to another aspect of the disclosure, a vehicle including a driver assistance apparatus configured to assist driving of the vehicle is provided. The driver assistance apparatus is configured to acquire first behavior data directly or via an external server from an environment recognition device. The first behavior data is behavior data of a predetermined first mobile body detected by the environment recognition device provided separately from the first mobile body. The first mobile body is different from the vehicle to assist. The driver assistance apparatus is configured to acquire second behavior data. The second behavior data is behavior data of a second mobile body present on a route on which the first mobile body is scheduled to travel and including a communication means for sending own behavior data directly or via the external server to the vehicle to assist. The driver assistance apparatus is configured to, when the first mobile body having been detected by the environment recognition device is no longer detected by the environment recognition device after first time when the first mobile body is last detected by the environment recognition device, predict a collision between the first mobile body and the vehicle to assist, based on the first behavior data of the first mobile body acquired before the first time, and the second behavior data acquired from the communication means of the second mobile body.

In addition, to address the above-described problem, according to another aspect of the disclosure, a recording medium recording a computer program to be applied to a driver assistance system configured to assist driving of a vehicle is provided. The computer program causes one or more processors to execute a process including: acquiring first behavior data directly or via an external server from an environment recognition device, the first behavior data being behavior data of a predetermined first mobile body detected by the environment recognition device provided separately from the first mobile body which is different from the vehicle to assist; acquiring second behavior data, the second behavior data being behavior data of a second mobile body, the second mobile body being present on a route on which the first mobile body is scheduled to travel and including a communication means for sending own behavior data directly or via the external server to the vehicle to assist; and predicting, when the first mobile body having been detected by the environment recognition device is no longer detected by the environment recognition device after first time when the first mobile body is last detected by the environment recognition device, a collision between the first mobile body and the vehicle to assist, based on the first behavior data of the first mobile body acquired before the first time, and the second behavior data acquired from the communication means of the second mobile body.

Effects of the Invention

As described above, according to the disclosure, it is possible to reduce a risk of an accident between a vehicle to assist and a first mobile body unable to send own behavior data to the vehicle to assist at an intersection.

MODES FOR CARRYING OUT THE INVENTION

Figure 1:
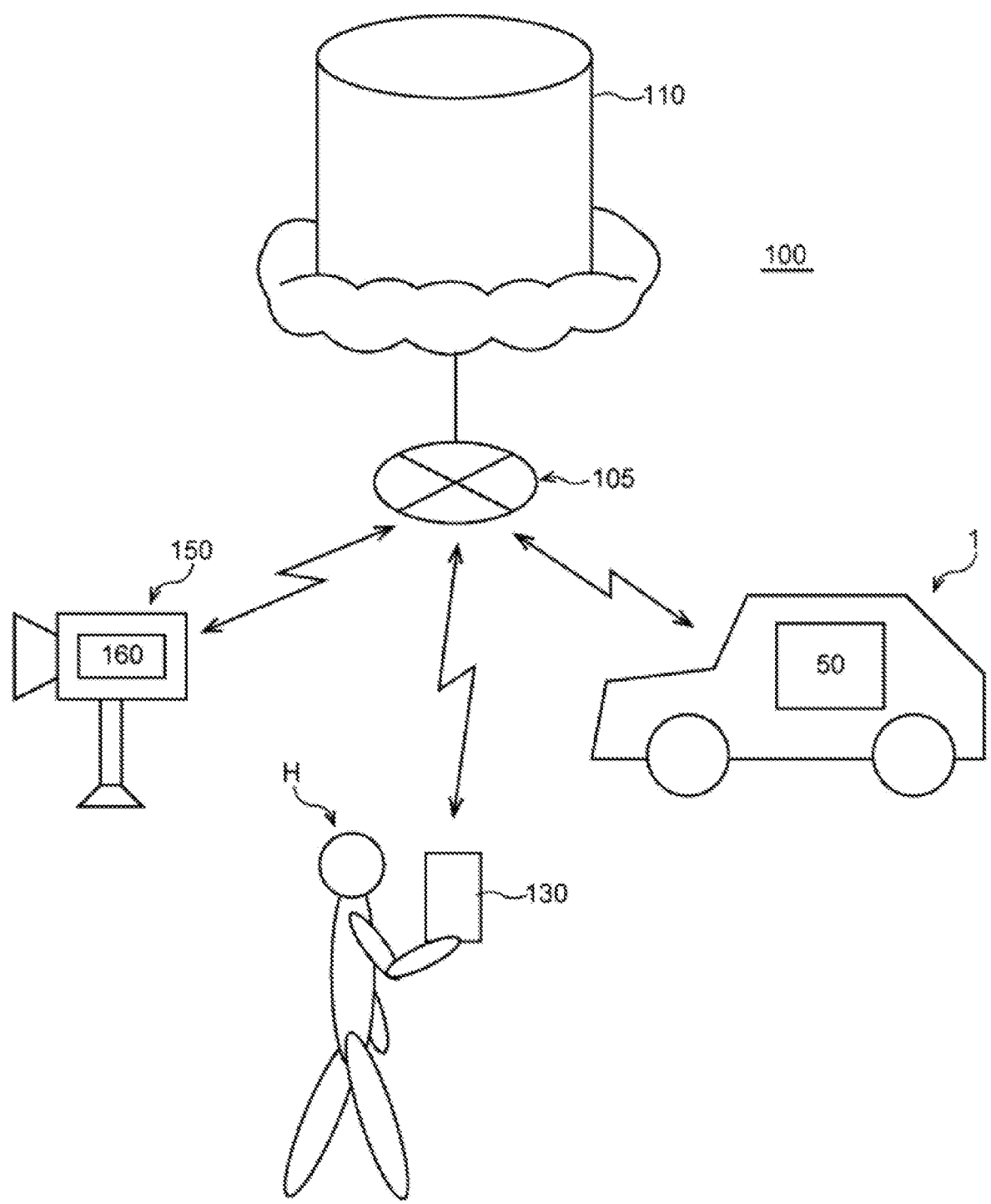
FIG. 1 is a schematic diagram illustrating a basic configuration of a driver assistance system according to a first embodiment of the disclosure.

In the following, some preferred embodiments of the disclosure are described in detail with reference to the accompanying drawings. Throughout the present description and the drawings, elements having substantially the same function and configuration are denoted with the same reference numerals to avoid any redundant description.

It is to be noted that, in the following embodiments, a description is given of an example where "another vehicle" corresponds to a "first mobile body", a "pedestrian" corresponds to a "second mobile body", a "portable terminal"

corresponds to a "communication means for sending behavior data of the second mobile body", and a "road camera" corresponds to an "environment recognition device". However, this example does not limit the elements.

1. First Embodiment

<1-1. Basic Configuration of Driver Assistance System>

First, a description is given of an example of a basic configuration of a driver assistance system according to a first embodiment of the disclosure.

FIG. 1 is an explanatory diagram illustrating an example of a basic configuration of a driver assistance system 100.

The driver assistance system 100 includes a driver assistance apparatus 50 mounted in a vehicle 1 to assist, a road camera 150 installed on, for example, a road, a portable terminal 130 held by, for example, a pedestrian H, and a management server 110. For easier understanding, one driver assistance apparatus 50, one road camera 150, one portable terminal 130, and one management server 110 are illustrated; however, a plurality of each of these components may be provided.

The driver assistance apparatus 50, the road camera 150, and the portable terminal 130 are each communicably coupled to the management server 110 via one or more communication networks 105. For example, the driver assistance apparatus 50 and the portable terminal 130 are coupled to the management server 110 via a mobile communication network. The road camera 150 may be coupled to the management server 110 via the mobile communication network. Alternatively, the road camera 150 may be coupled to the management server 110 via a wired communication network or a dedicated line.

The road camera 150 is an example of the environment recognition device. The road camera 150 is installed on the road, and executes an object recognition process by generating image data of an imaging range at a predetermined processing cycle and conducting image processing on the captured images. However, the environment recognition device is not limited to the road camera 150, and may be a LiDAR, a radar sensor, an ultrasonic camera, or another device configured to recognize an object, which is fixed to a predetermined position. Alternatively, the environment recognition device may be an object recognition system including a camera or a LiDAR mounted in a mobile body such as a vehicle.

In the disclosure, the road camera 150 detects a mobile body such as a vehicle, a bicycle, or a pedestrian at the predetermined processing cycle. In addition, the road camera 150 calculates a moving direction and a moving speed of the mobile body detected, based on a change in position of the mobile body over time. The road camera 150 sends the data on the mobile body detected, together with the data on the moving direction and the moving speed, and data on an installation position and an imaging direction of the road camera 150 on map data to the management server 110 at a predetermined processing cycle. The data on the installation position of the road camera 150 is preliminarily stored as data on the longitude and the latitude on the map data, for example. The data on the imaging direction of the road camera 150 may be stored as a vector value on a coordinate system having an x axis representing a longitude and a y axis representing a latitude. Alternatively, the data on the imaging direction of the road camera 150 may be stored as data on an orientation with respect to the road on which the road camera 150 is installed. In the first embodiment, the data on the position, moving direction, and moving speed of the mobile body detected by the road camera 150 corresponds to first behavior data, which is behavior data of the first mobile body (the other vehicle).

The portable terminal 130 is, for example, a smartphone, a smartwatch, or another wearable device. The portable terminal 130 detects position data of the portable terminal 130 at a predetermined processing cycle, and determines a moving direction and a moving speed of the portable terminal 130 through calculation based on a change in position of the portable terminal 130 over time. The position data of the portable terminal 130 is acquired based on satellite signals sent from a global navigation satellite system (GNSS) such as the global positioning system (GPS), for example. The portable terminal 130 sends the data on the position, moving direction, and moving speed of the portable terminal 130 to the management server 110 at a predetermined processing cycle. In the first embodiment, the data on the position, moving direction, and moving speed of the portable terminal 130 corresponds to second behavior data, which is behavior data of the second mobile body (the pedestrian H) holding the portable terminal 130.

The management server 110 is, for example, an information processor communicably coupled to the road camera 150, the portable terminal 130, and the driver assistance apparatus 50 via the communication network 105 using a cloud computing technique. The management server 110 receives the captured images and data on result of the object recognition process from the road camera 150 at a predetermined processing cycle. The data on the result of the object recognition process includes the data on the first mobile body detected and the first behavior data of the first mobile body. In addition, the management server 110 receives the data on the position, moving direction, and moving speed of the portable terminal 130 (i.e., the second behavior data) from the portable terminal 130 at a predetermined processing cycle.

Further, the management server 110 receives position data of the vehicle 1 from the driver assistance apparatus 50 at a predetermined processing cycle. The management server 110 identifies the road camera 150 and the portable terminal 130 present within a predetermined area determined based on the position of the vehicle 1, and sends the first behavior data and the second behavior data received from the road camera 150 and the portable terminal 130 identified to the driver assistance apparatus 50. That is, the management server 110 collects the information from the road camera 150 and the portable terminal 130 and provides the information on the other mobile body present within a surrounding area of the traveling position of the vehicle 1 to the vehicle 1.

The driver assistance apparatus 50 is mounted on the vehicle 1 to assist. The driver assistance apparatus 50 detects the position data of the vehicle 1 at a predetermined processing cycle, and sends the position data detected to the management server 110. The position data of the vehicle 1 is acquired based on satellite signals sent from a GNSS such as the GPS, for example. In addition, the driver assistance apparatus 50 receives the first behavior data and the second behavior data from the management server 110 at a predetermined processing cycle, and estimate a collision between the vehicle 1 to assist and the other mobile body (the other vehicle). When the collision between the vehicle 1 to assist and the other mobile body (the other vehicle) is predicted to occur, the driver assistance apparatus 50 executes a process for avoiding the collision.

In the following, a functional configuration and an operation of each of the road camera 150, the portable terminal 130, the management server 110, and the driver assistance apparatus 50 are specifically described.

<1-2. Road Camera>

First, the road camera 150 as an example of the environment recognition device is described in detail.

(1-2-1. Functional Configuration)

Figure 2:
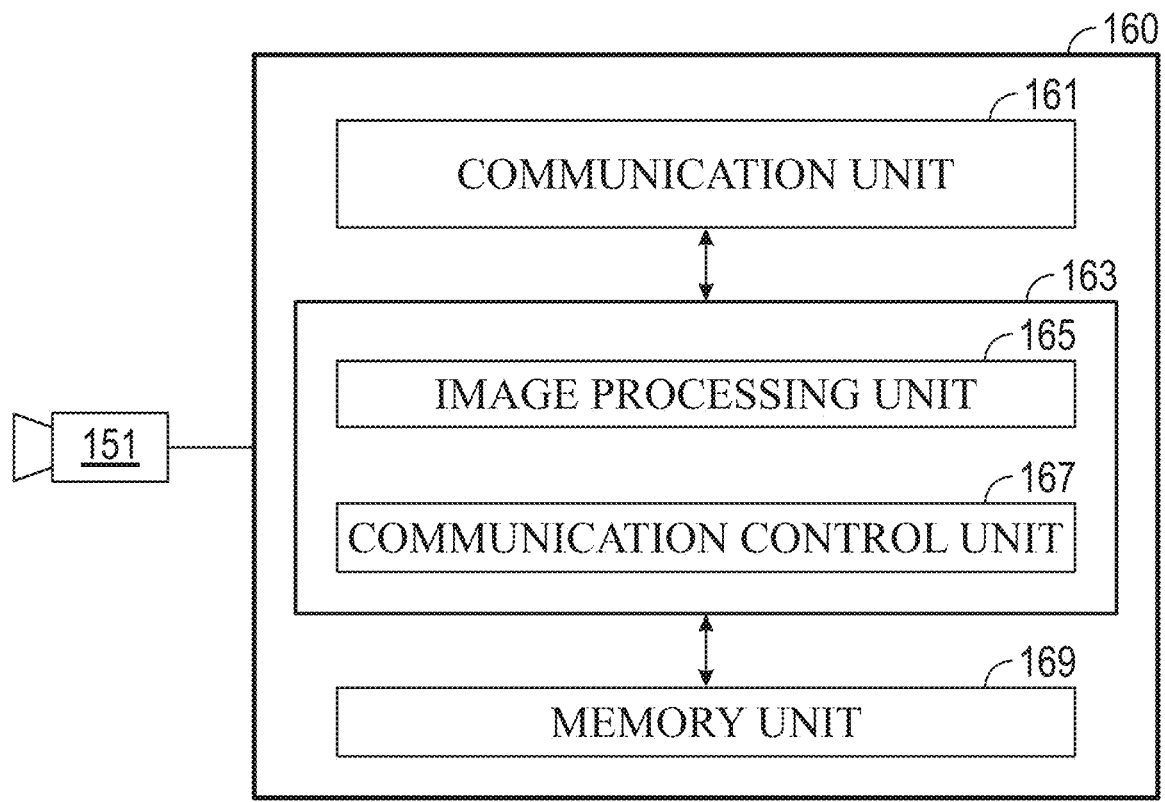
FIG. 2 is a block diagram illustrating a configuration example of an environment recognition device (a road camera) of the driver assistance system according to the first embodiment.

FIG. 2 is a block diagram illustrating a functional configuration of the road camera 150.

The road camera 150 includes an image generation unit 151 and an image processor 160. The image generation unit 151 includes, for example, an imaging device such as a charge coupled device (CCD) or a complementary metal-oxide semiconductor (CMOS) to generate image data of an imaging range. The image generation unit 151 generates the image data at a predetermined processing cycle and outputs the generated image data to the image processor 160.

The image processor 160 includes a communication unit 161, a processing unit 163, and a memory unit 169. The communication unit 161 is an interface that communicates with the management server 110 via the communication network 105. The processing unit 163 includes one or more central processing units (CPUs) such as graphics processing units (GPUs). The processing unit 163 executes a predetermined object recognition process at a predetermined processing cycle based on image data received from the image generation unit 151, and sends data on results of the recognition to the management server 110.

The memory unit 169 includes one or more memories. The memory unit 169 stores computer programs to be executed by the processing unit 163, various parameters to be used in calculation processes, and data on results of calculations. Examples of the memory unit 169 may include a hard disk, a magnetic medium such as a floppy disk or a magnetic tape, an optical recording medium such as a compact disk read only memory (CD-ROM), a digital versatile disk (DVD), or Blu-ray (registered trademark), a magnetooptical medium such as a floptical disk, a memory element such as a random access memory (RAM) or a read only memory (ROM), a flash memory such as a universal serial bus (USB) memory or a solid state drive (SSD), and another recording medium.

The processing unit 163 includes an image processing unit 165 and a communication control unit 167. Functions of these units are implemented by processors executing computer programs. The image processing unit 165 executes the object recognition process at the predetermined processing cycle based on the image data received from the image generation unit 151. The image processing unit 165 executes the process for recognizing an object present within the imaging range by extracting feature points from the image data using a technique such as edge detection processing, and performing matching with feature point data of various obstacles preliminarily stored (also referred to pattern matching). In the road camera 150, the process for recognizing mainly a mobile body is performed. Examples of the mobile body to recognize include another vehicle, a pedestrian, and a bicycle.

In addition, the image processing unit 165 determines data on a moving speed and a moving direction of the mobile body recognized. For example, the image processing unit 165 is configured to calculate the moving speed and the moving direction of the mobile body based on changes in position and size of the mobile body over time included in the image data received at the predetermined processing cycle. Note that the method of determining the speed and the moving direction of the mobile body recognized through the image processing may be executed using a known technique and is not particularly limited.

The communication control unit 167 sends the data on the type of the mobile body and the data on the moving speed and moving direction of the mobile body determined by the image processing unit 165 to the management server 110. In this case, the communication control unit 167 also sends the data on the installation position and the imaging direction of the road camera 150 together with the above-described data to the management server 110. When the management server 110 stores the data on the installation position and the imaging direction of each road camera 150, the road camera 150 may send identification data for identifying each road camera 150 to the management server 110.

(1-2-2. Processing Operations)

Figure 3:
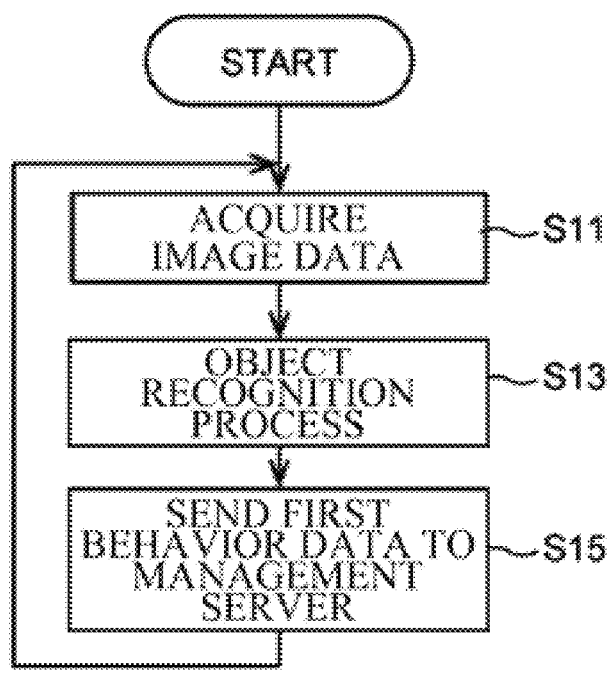
FIG. 3 is a flowchart of processing operations of the environment recognition device (the road camera) of the driver assistance system according to the first embodiment.

FIG. 3 illustrates a flowchart of a processing operation of the image processor 160 of the road camera 150. The flowchart illustrated in FIG. 3 is repeatedly executed at a predetermined processing cycle.

The image processing unit 165 of the processing unit 163 acquires the image data outputted from the image generation unit 151 (Step S11).

Thereafter, the image processing unit 165 executes the object recognition process based on the image data acquired (Step S13). As described above, the image processing unit 165 executes the process for recognizing an object present within the imaging range by extracting the feature points from the image data using a technique such as edge detection processing, and performing matching with the feature point data of various obstacles preliminarily stored. In the road camera 150, the process for recognizing mainly a mobile body is performed. Examples of a mobile body to recognize include another vehicle, a pedestrian, and a bicycle. In addition, the image processing unit 165 determines the data on the moving speed and moving direction of the mobile body recognized. For example, the image processing unit 165 is configured to calculate the moving speed and the moving direction of the mobile body based on the changes in position and size of the mobile body over time included in the image data received at the predetermined processing cycle.

Thereafter, the communication control unit 167 sends the data on the type of the mobile body and the data on the moving speed and moving direction of the mobile body determined by the image processing unit 165 to the management server 110 (Step S15). The communication control unit 167 also sends the data on the installation position and the imaging direction of the road camera 150 on the map data together with the above-described data to the management server 110. The data to be sent corresponds to the first behavior data of the mobile body (the first mobile body). The image processor 160 repeatedly executes the processes at Steps S11 to S15 described above at a predetermined processing cycle.

Note that the first mobile body detected by the road camera 150 is, for example, a vehicle. However, the first mobile body is not particularly limited as long as being an object movable at a predetermined moving speed, such as a bicycle or a motorcycle, other than a vehicle.

<1-3. Portable Terminal>

Next, the portable terminal 130 is described in detail.

(1-3-1. Functional Configuration)

Figure 4:
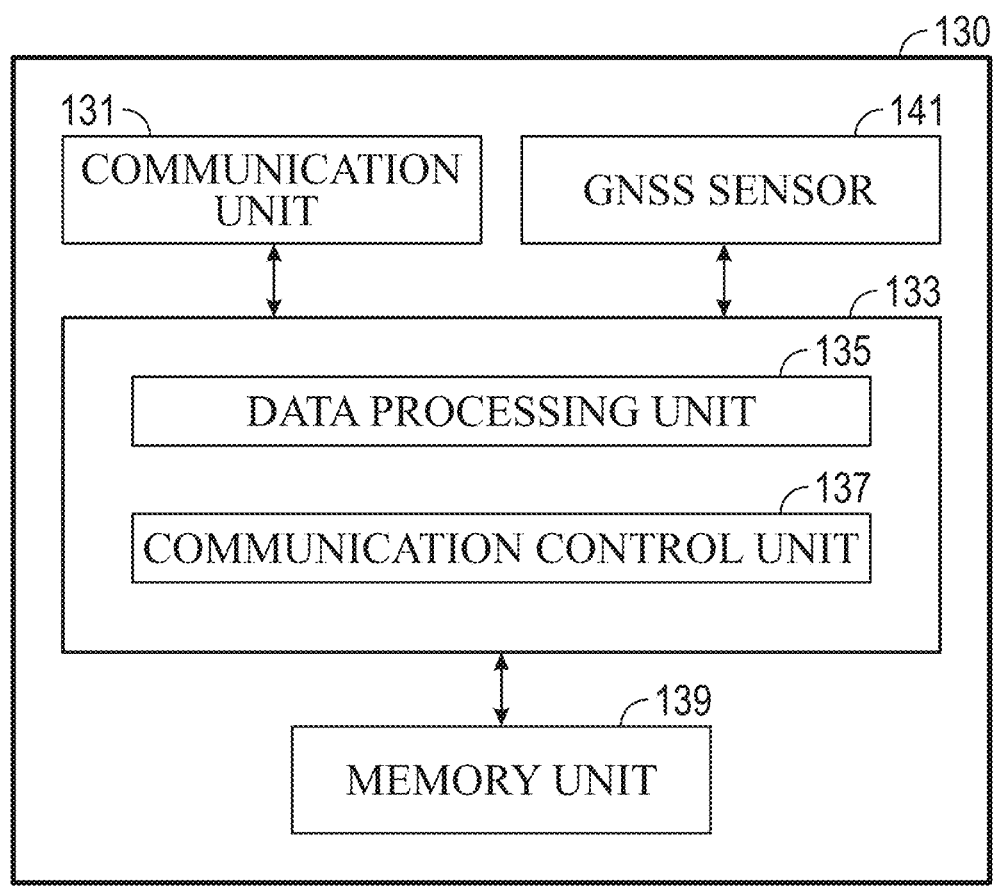
FIG. 4 is a block diagram illustrating a configuration example of a portable terminal of the driver assistance system according to the first embodiment.

FIG. 4 is a block diagram illustrating a functional configuration of the portable terminal 130.

The portable terminal 130 includes a communication unit 131, a processing unit 133, a memory unit 139, and a GNSS sensor 141. The communication unit 131 is an interface that communicates with the management server 110 via the communication network 105. The GNSS sensor 141 receives satellite signals sent from the GNSS satellites such as the GPS. The satellite signals include data indicating a position of the portable terminal 130 on the map data. For example, the position of the portable terminal 130 is indicated as data on the longitude and the latitude. The GNSS sensor 141 outputs the position data of the portable terminal 130 acquired to the processing unit 133.

The processing unit 133 includes one or more CPUs. The processing unit 133 acquires the position data of the portable terminal 130 at a predetermined processing cycle, calculates a moving speed and a moving direction of the portable terminal 130, and sends results of the calculation to the management server 110. The memory unit 139 includes one or more memories. The memory unit 139 stores computer programs to be executed by the processing unit 133, various parameters to be used in the calculation processes, and data on the results of calculations. The memory unit 139 may be a memory element such as a RAM or a ROM, a flash memory such as an SSD, or another recording medium.

The processing unit 133 includes a data processing unit 135 and a communication control unit 137. Functions of these units are implemented by processors executing computer programs. The data processing unit 135 calculates the moving speed and the moving direction of the portable terminal 130 based on the position data received from the GNSS sensor 141 at the predetermined processing cycle. For example, the data processing unit 135 is configured to calculate the moving speed and the moving direction of the portable terminal 130 based on a change over time in position data received at the predetermined processing cycle.

The communication control unit 137 sends the position data of the portable terminal 130 received from the GNSS sensor 141 and the data on the moving speed and moving direction of the portable terminal 130 determined by the data processing unit 135 to the management server 110.

(1-3-2. Processing Operation)

Figure 5:
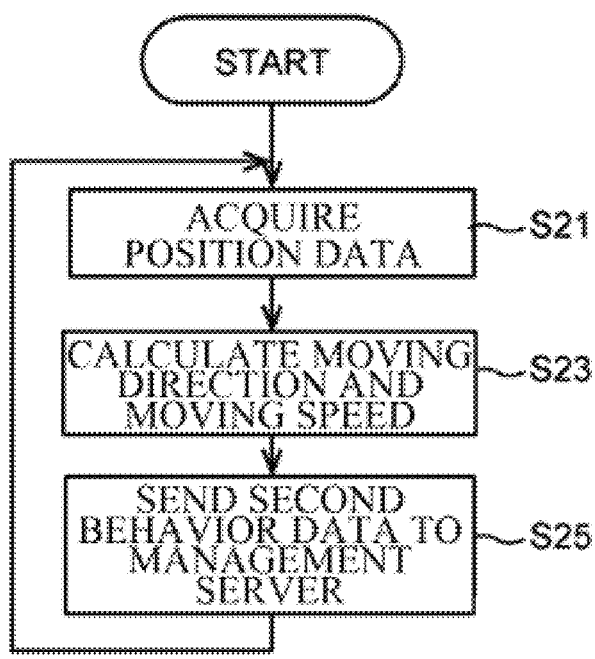
FIG. 5 is a flowchart of a processing operation of the portable terminal of the driver assistance system according to the first embodiment.

FIG. 5 illustrates a flowchart of a processing operation of the portable terminal 130. The flowchart illustrated in FIG. 5 is repeatedly executed at a predetermined processing cycle.

The data processing unit 135 of the processing unit 133 acquires the position data sent from the GNSS sensor 141 (Step S21). Thereafter, the data processing unit 135 calculates the moving direction and the moving speed of the portable terminal 130 based on the position data acquired (Step S23). Specifically, the data processing unit 135 determines the moving speed by performing a time derivative of a moving distance based on the position data received at the predetermined processing cycle. In addition, the data processing unit 135 determines a moving vector (the moving direction) on the map data based on the position data received at the predetermined processing cycle.

Thereafter, the communication control unit 137 sends the position data acquired from the GNSS sensor 141 and the data on the calculated moving speed and moving direction to the management server 110 (Step S25). The data to be sent corresponds to the second behavior data of the pedestrian (the second mobile body) H holding the portable terminal 130. The portable terminal 130 repeatedly executes the processes at Steps S21 to S25 described above at a predetermined processing cycle.

Note that the second mobile body holding the portable terminal 130 is not limited to a pedestrian, and may be a vehicle, a motorcycle, a bicycle, or another object that moves at a predetermined moving speed.

<1-4. Management Server>

Next, the management server 110 is described in detail.

(1-4-1. Functional Configuration)

Figure 6:
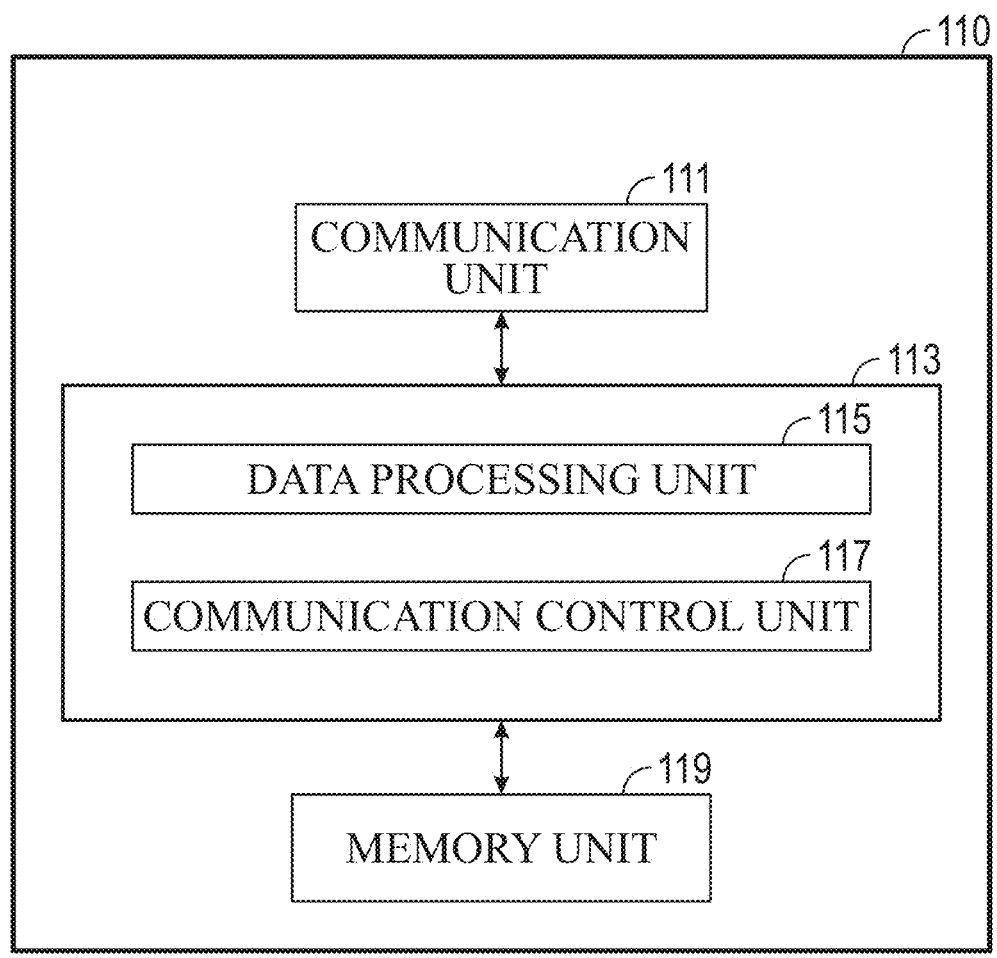
FIG. 6 is a block diagram illustrating a configuration example of a management server of the driver assistance system according to the first embodiment.

FIG. 6 is a block diagram illustrating a functional configuration of the management server 110.

The management server 110 includes a communication unit 111, a processing unit 113, and a memory unit 119. The communication unit 111 is an interface that communicates with the road camera 150, the portable terminal 130, and the driver assistance apparatus 50 via the communication network 105. The processing unit 113 includes one or more CPUs. The processing unit 113 acquires information sent from the road camera 150, the portable terminal 130, and the driver assistance apparatus 50 at the predetermined processing cycle. The processing unit 113 sends the information received from the road camera 150 and the portable terminal 130 present within the predetermined area determined based on the position of the driver assistance apparatus 50 to the driver assistance apparatus 50.

The memory unit 119 includes one or more memories. The memory unit 119 stores computer programs to be executed by the processing unit 113, various parameters to be used in calculation processes, and data on results of calculations. Examples of the memory unit 119 may include a hard disk, a magnetic medium such as a floppy disk or a magnetic tape, an optical recording medium such as a CD-ROM, a DVD, or Blu-ray (registered trademark), a magnetooptical medium such as a floptical disk, a memory element such as a RAM or a ROM, a flash memory such as a USB memory or an SSD, and another recording medium.

The processing unit 113 includes a data processing unit 115 and a communication control unit 117. Functions of these units are implemented by processors executing computer programs. The data processing unit 115 identifies a position of the vehicle 1 to assist on the map data based on the position data sent from the driver assistance apparatus 50, and extracts the road camera 150 and the portable terminal 130 present within a predetermined radial area from the position of the vehicle 1. The communication control unit 117 sends the data on the type of the mobile body, the moving speed, and the moving direction of the mobile body received from the extracted road camera 150 together with the position data of the road camera 150 on the map data to the driver assistance apparatus 50. The communication control unit 117 sends the position data of the portable terminal 130 and the data on the moving speed and moving direction of the portable terminal 130 received from the extracted portable terminal 130 to the driver assistance apparatus 50.

The data processing unit 115 may determine a traveling direction of the vehicle 1 to assist based on the position data sent from the driver assistance apparatus 50, or may acquire data on the traveling direction of the vehicle 1 to assist from the driver assistance apparatus 50. The data processing unit 115 then extracts the road camera 150 and the portable terminal 130 present on a road connecting to (or crossing) the traveling direction. This prevents information other than the information for predicting a collision between the vehicle 1 to assist and a mobile body having a possibility of a collision from being sent to the driver assistance apparatus 50, reducing a load of the calculation processing on the management server 110 and the driver assistance apparatus 50.

(1-4-2. Processing Operation)

Figure 7:
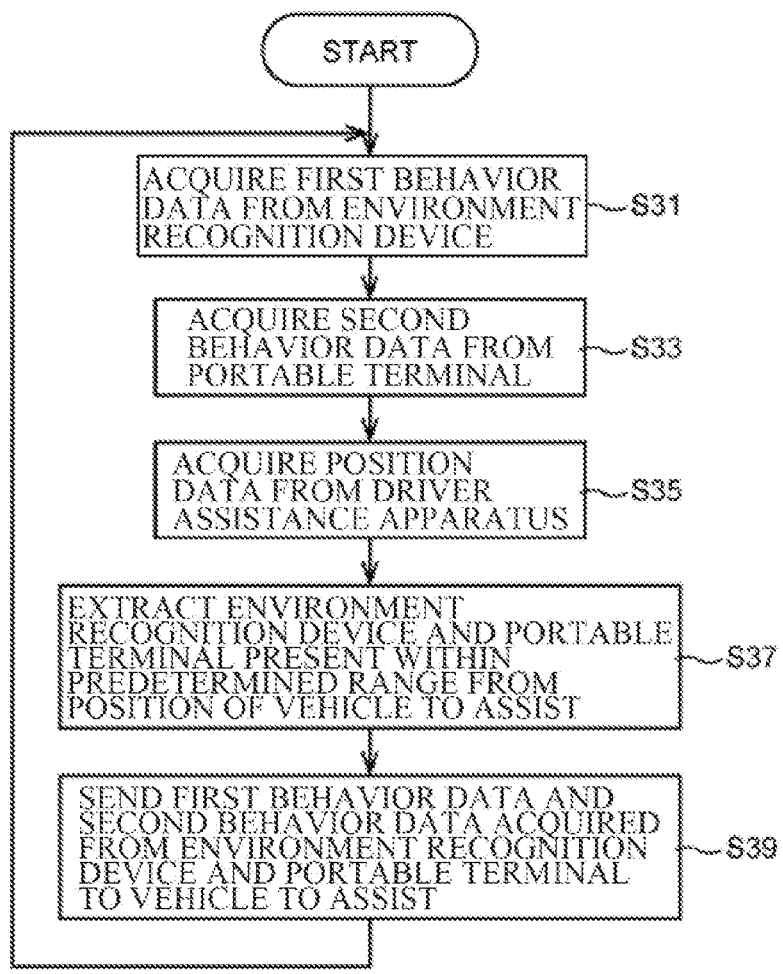
FIG. 7 is a flowchart of a processing operation of the management server of the driver assistance system according to the first embodiment.

FIG. 7 illustrates a flowchart of a processing operation of the management server 110. The flowchart illustrated in FIG. 7 is repeatedly executed at a predetermined processing cycle.

The data processing unit 115 of the processing unit 113 acquires the first behavior data sent from one or more environment recognition devices (e.g., the road cameras 150) (Step S31). The data processing unit 115 acquires the data on the type of the detected mobile body and the data on the installation position and imaging direction of the road camera 150 which sends the data on the type of the detected mobile body, together with the first behavior data. Based on these pieces of information, it is possible to determine the type of the mobile body, the position of the mobile body, the moving direction of the mobile body, and the moving speed of the mobile body.

Thereafter, the data processing unit 115 acquires the second behavior data sent from the one or more portable terminals 130 (Step S33). Based on the second behavior data, the data processing unit 115 determines the position, the moving direction, and the moving speed of the mobile body (pedestrian H) holding the portable terminal 130.

Thereafter, the data processing unit 115 acquires the position data of the vehicle 1 from the driver assistance apparatus 50 mounted in the vehicle 1 to assist (Step S35). The position data of the vehicle 1 is data indicating the position of the vehicle 1 on the map data, and is indicated as data on the longitude and the latitude.

Thereafter, the data processing unit 115 extracts the environment recognition device (the road camera 150) and the portable terminal 130 present within a predetermined distance from the vehicle 1 to assist (Step S37). For example, the data processing unit 115 extracts the road camera 150 and the portable terminal 130 present within a predetermined radial area from the position of the vehicle 1.

Thereafter, the communication control unit 117 sends the first behavior data and the second behavior data acquired from the extracted environment recognition device (road camera 150) and the extracted portable terminal 130, respectively, to the vehicle 1 to assist (Step S39). The management server 110 repeatedly executes the processes at Steps S31 to Step S39 described above at a predetermined processing cycle.

<1-5. Driver Assistance Apparatus>
(1-5-1. Vehicle)

A description is given of an exemplary overall configuration of the vehicle 1 to assist which includes the driver assistance apparatus 50 before a description is given of a functional configuration of the driver assistance apparatus 50 according to an embodiment of the disclosure.

Figure 8:
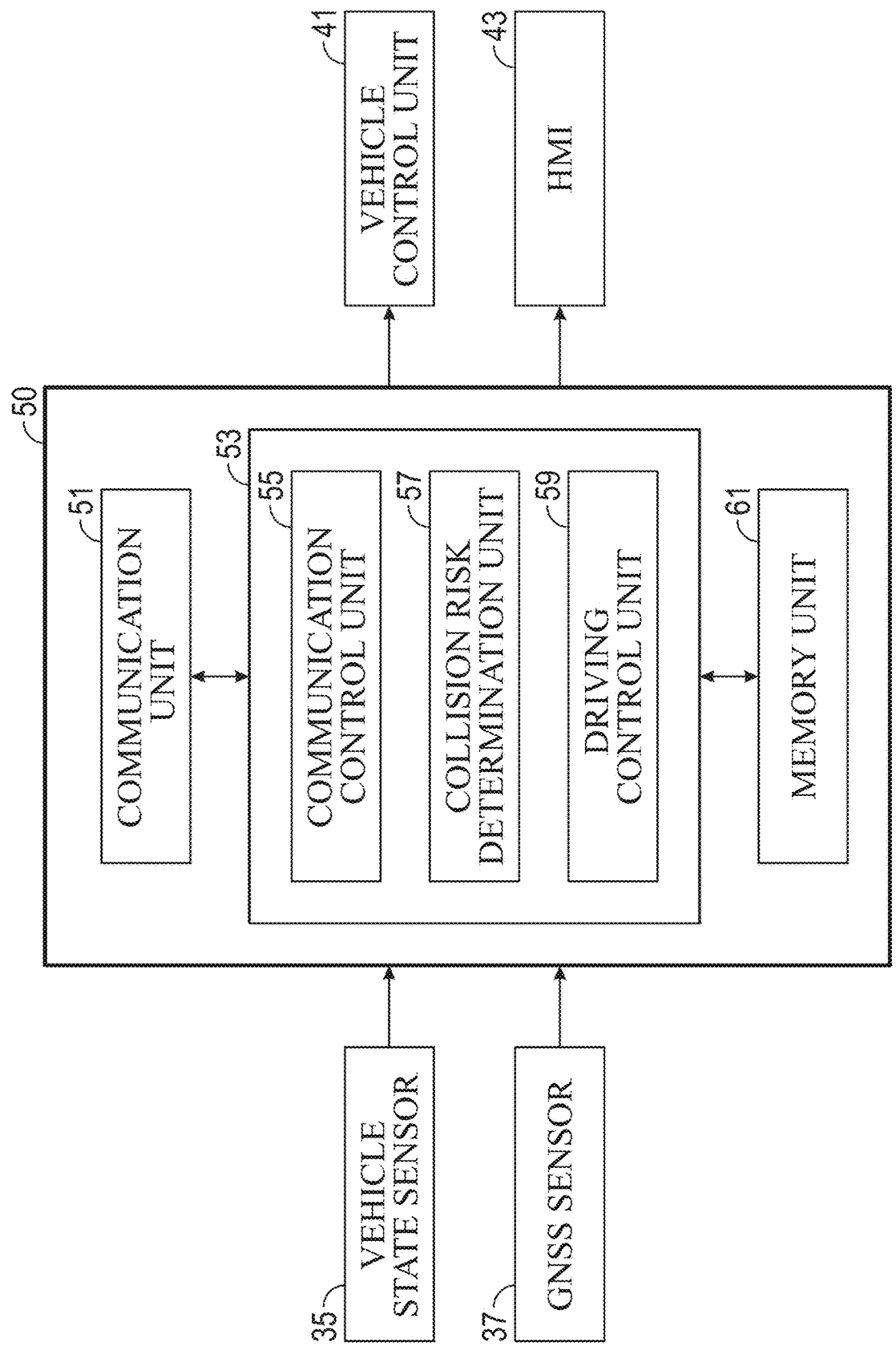
FIG. 8 is a schematic diagram illustrating a configuration example of a vehicle to assist by the driver assistance system according to the first embodiment.

FIG. 8 is a schematic diagram illustrating a configuration example of the vehicle 1 including the driver assistance apparatus 50.

The vehicle 1 illustrated in FIG. 8 is configured as a four-wheel-drive car that transmits driving torque outputted from a driving power source 9 that generates driving torque of the vehicle to a left-front wheel 3LF, a right-front wheel 3RF, a left-rear wheel 3LR, and a right-rear wheel 3RR (hereinafter collectively referred to as "wheels 3" when they are not to be distinguished from each other). The driving power source 9 may be an internal combustion engine, such as a gasoline engine or a diesel engine, or a drive motor. Alternatively, the driving power source 9 may include both of an internal combustion engine and a drive motor.

Note that the vehicle 1 may be an electric vehicle which includes two drive motors including, for example, a front-wheel drive motor and a rear-wheel drive motor, or an electric vehicle which includes a drive motor that drives each of the wheels 3. Further, in a case where the vehicle 1 is an electric vehicle or a hybrid electric vehicle, the vehicle 1 includes a power generator such as a secondary battery that accumulates electric power to be supplied to the drive motor, a motor that generates electric power to charge the battery, and a fuel cell.

The vehicle 1 includes the driving power source 9, an electric steering device 15, and brake devices 17LF, 17RF, 17LR, and 17RR (hereinafter collectively referred to as "brake devices 17" when they are not to be distinguished from each other, in particular) as devices used to control driving of the vehicle 1. The driving power source 9 outputs driving torque to be transmitted to a front-wheel drive shaft 5F and a rear-wheel drive shaft 5R via a non-illustrated transmission and a front-wheel differential mechanism 7F and a rear-wheel differential mechanism 7R. Driving of the driving power source 9 and the transmission is controlled by a vehicle control unit 41 including one or more electronic control units (ECU).

The electric steering device 15 is provided on the front-wheel drive shaft 5F. The electric steering device 15 includes a non-illustrated electric motor and a non-illustrated gear mechanism. The electric steering device 15 adjusts steering angles of the left-front wheel 3LF and the right-front wheel 3RF under control of the vehicle control unit 41. During manual driving, the vehicle control unit 41 controls the electric steering device 15 based on a steering angle of the steering wheel 13 set by a driver. Further, during automatic driving, the vehicle control unit 41 controls the electric steering device 15 based on a set traveling track.

The brake devices 17LF, 17RF, 17LR, and 17RR apply a braking force to the left-front wheel 3LF, the right-front wheel 3RF, the left-rear wheel 3LR, and the right-rear wheel 3RR, respectively. The brake devices 17 are configured as hydraulic brake devices, for example. Hydraulic pressure applied to each of the brake devices 17 is controlled by the vehicle control unit 41 to thereby generate a predetermined braking force. In a case where the vehicle 1 is an electric vehicle or a hybrid electric vehicle, the brake devices 17 are used together with regenerative braking by a drive motor.

The vehicle control unit 41 includes one or more electronic control devices that control driving of the driving power source 9 that outputs driving torque of the vehicle 1, the electric steering device 15 that controls a steering angle of the steering wheel or steering angles of the steered wheels, and the brake devices 17 that control the braking force of the vehicle 1. The vehicle control unit 41 may have a function to control driving of the transmission that converts driving torque from the driving power source 9 and transmits the converted driving torque to the wheels 3. The vehicle control unit 41 is configured to acquire the information sent from the driver assistance apparatus 50 and execute automatic driving control of the vehicle 1.

Further, the vehicle 1 includes a vehicle state sensor 35, a GNSS sensor 37, and a human machine interface (HMI) 43. The vehicle state sensor 35 includes one or more sensors that detect operational states and behaviors of the vehicle 1. The vehicle state sensor 35 includes one or more of a steering angle sensor, an accelerator position sensor, a brake stroke sensor, a brake pressure sensor, and an engine revolution sensor, for example. The vehicle state sensor 35 detects operational states of the vehicle 1, such as a steering angle of the steering wheel or steering angles of the steered wheels, an accelerator position, a brake operation amount, or an engine revolution number. Further, the vehicle state sensor 35 includes one or more of a vehicle speed sensor, an acceleration sensor, and an angular speed sensor, for example. The vehicle state sensor 35 detects vehicle behaviors such as a vehicle speed, forward and backward acceleration rates, a lateral acceleration rate, or a yaw rate. The vehicle state sensor 35 sends a sensor signal including the detected data to the driver assistance apparatus 50.

The GNSS sensor 37 receives satellite signals from GNSS satellites such as the GPS. The GNSS sensor 37 outputs the position data of the vehicle 1 on the map data included in the received satellite signals to the driver assistance apparatus 50. Note that the GNSS sensor 37 is not limited to the GPS sensor, and may be provided with an antenna that receives satellite signals for identifying the position of the vehicle 1 from another satellite system.

The HMI 43 is driven by the driver assistance apparatus 50 to present various pieces of information to the driver by means of image display or sound output, for example. The HMI 43 includes a display device disposed in an instrument panel and a speaker disposed in the vehicle, for example. The display device may be a display device of a navigation system. The HMI 43 may further include a head-up display (HUD) that displays an image on a front windshield such that the image is superimposed on the scenery around the own vehicle 1.

(1-5-2. Functional Configuration)

Next, a description is given of a functional configuration of the driver assistance apparatus 50.

The driver assistance apparatus 50 serves as an apparatus that assists driving of a vehicle when one or more processors such as CPUs execute computer programs. The computer programs are computer programs that cause the processors to execute an operation (to be described later) to be performed by the driver assistance apparatus 50. The computer programs to be executed by the processors may be stored in a recording medium serving as a memory unit (memory) 61 provided in the driver assistance apparatus 50. Alternatively, the computer programs may be stored in a recording medium included in the driver assistance apparatus 50 or any external recording medium attachable to the driver assistance apparatus 50.

Examples of the recording medium that stores the computer programs may include a hard disk, a magnetic medium such as a floppy disk or a magnetic tape, an optical recording medium such as a CD-ROM, a DVD, or Blu-ray (registered trademark), a magnetooptical medium such as a floptical disk, a memory element such as a RAM or a ROM, a flash memory such as a USB memory or a SSD, and another recording medium.

Figure 9:
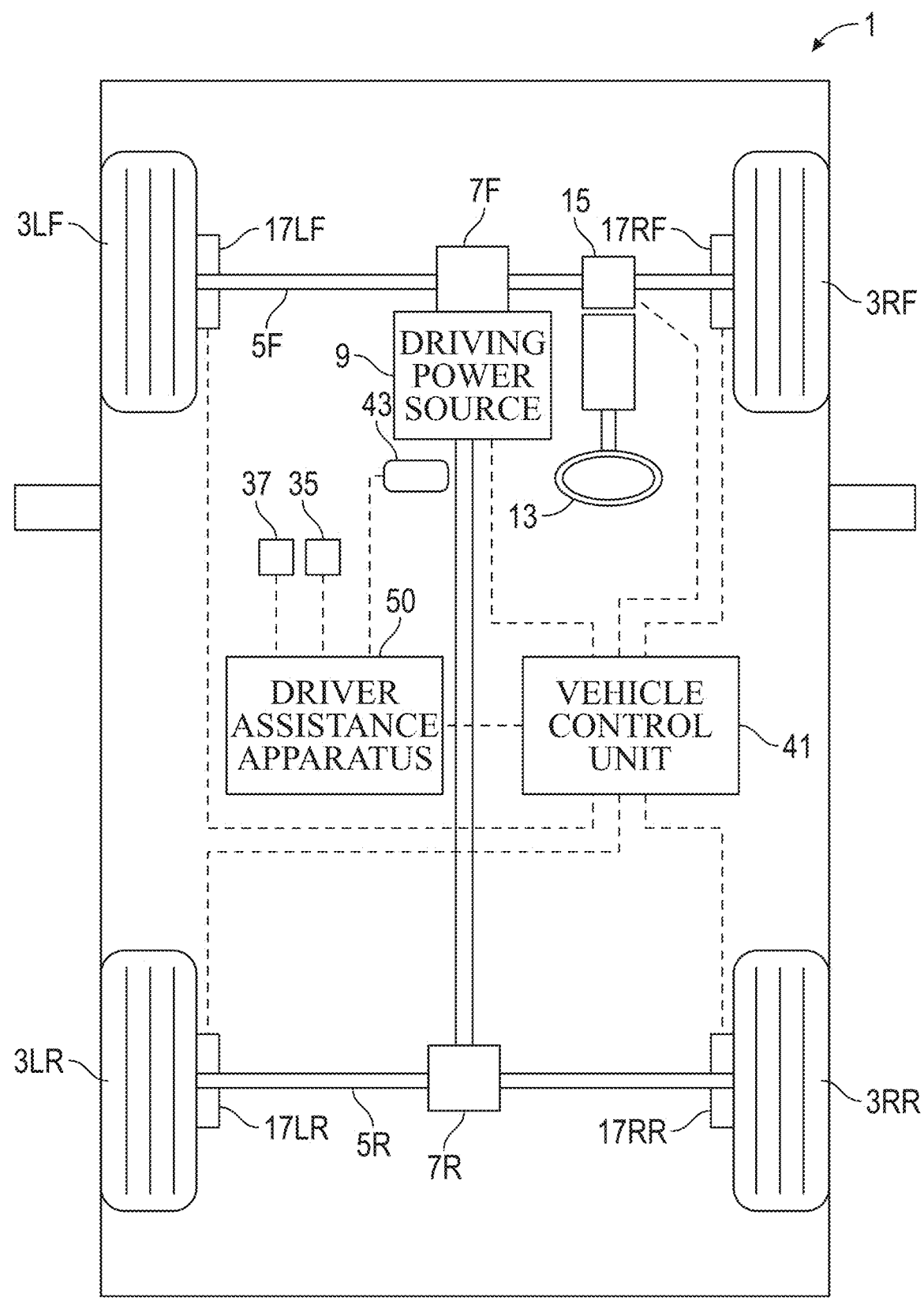
FIG. 9 is a block diagram illustrating a configuration example of a driver assistance apparatus of the driver assistance system according to the first embodiment.

FIG. 9 is a block diagram illustrating the functional configuration of the driver assistance apparatus 50.

The vehicle state sensor 35 and the GNSS sensor 37 are coupled directly or via a communication means such as a controller area network (CAN) or a local inter net (LIN) to the driver assistance apparatus 50. Further, the vehicle control unit 41 and the HMI 43 are coupled to the driver assistance apparatus 50. Note that the driver assistance apparatus 50 is not limited to an electronic control apparatus mounted in the vehicle 1, and may be a terminal device such as a smartphone or a wearable device.

The driver assistance apparatus 50 includes a communication unit 51, a processing unit 53, and a memory unit 61. The communication unit 51 is an interface that communicates with the management server 110 via the communication network 105. The processing unit 53 may include one or more processors such as CPUs. A part or the entirety of the processing unit 53 may be configured by updatable software such as firmware. Alternatively, the processing unit 53 may be, for example, a program module to be executed in response to commands from the CPUs, for example.

The memory unit 61 includes one or more memories including a RAM or a ROM, for example. The memory unit 61 is communicably coupled to the processing unit 53. Note that the memory unit 61 is not limited to a particular type or number. The memory unit 61 stores computer programs to be executed by the processing unit 53, various parameters to be used in calculation processes, detected data, and data on results of calculations. Further, the memory unit 61 stores the map data.

The processing unit 53 includes a communication control unit 55, a collision risk determination unit 57, and a driving control unit 59. Functions of these units are implemented by processors executing computer programs. Note that some of the communication control unit 55, the collision risk determination unit 57, and the driving control unit 59 may be configured by hardware such as analog circuitry.

The communication control unit 55 sends the position data of the vehicle 1 received from the GNSS sensor 37 at the predetermined processing cycle to the management server 110. The communication control unit 55 may send the data on the moving direction of the vehicle 1 together with the position data of the vehicle 1 to the management server 110.

The collision risk determination unit 57 predicts a collision between the vehicle 1 to assist and another mobile body. In the first embodiment, the collision risk determination unit 57 predicts a collision between the vehicle 1 and another mobile body based on the information sent from the management server 110 including the first behavior data of the first mobile body detected by the road camera 150, the data on the position, moving speed, and moving direction of the portable terminal 130 (the second behavior data), and the data on the moving speed and course of the vehicle 1. Specifically, after first time when the first behavior data of the first mobile body detected by the road camera 150 is last acquired, the collision risk determination unit 57 estimates time when the first mobile body will intersect the course of the vehicle 1 to assist based on the first behavior data of the mobile body acquired before the first time and the second behavior data acquired from the portable terminal 130. Thereafter, the collision risk determination unit 57 predicts a collision between the vehicle 1 and the first mobile body based on a difference between the estimated time when the first mobile body will intersect the course of the vehicle 1 to assist and estimated time when the vehicle 1 will pass through the intersection position. A specific process to be performed by the collision risk determination unit 57 will be described in detail later.

When the collision risk determination unit 57 predicts that a collision between the vehicle 1 and the first mobile body will occur, the driving control unit 59 sets driving conditions of the vehicle 1 to reduce the risk of the collision. The driving conditions include a condition on a target deceleration rate to decelerate the vehicle 1, for example. The driving conditions may include a condition on a target steering angular velocity to change a traveling track of the vehicle 1 in addition to the condition on the target deceleration rate. The driving control unit 59 sends the information on the set driving conditions to the vehicle control unit 41. The vehicle control unit 41 controls traveling of the vehicle 1 based on the driving conditions acquired. The driving control unit 59 may set the target deceleration rate or the target steering angular velocity such that the target deceleration rate or the target steering angular velocity does not exceed a predetermined upper limit of the deceleration rate or a predetermined upper limit of the steering angular velocity. This prevents abrupt steering and abrupt deceleration of the own vehicle 1.

(1-5-3. Processing Operation)

Figure 10:
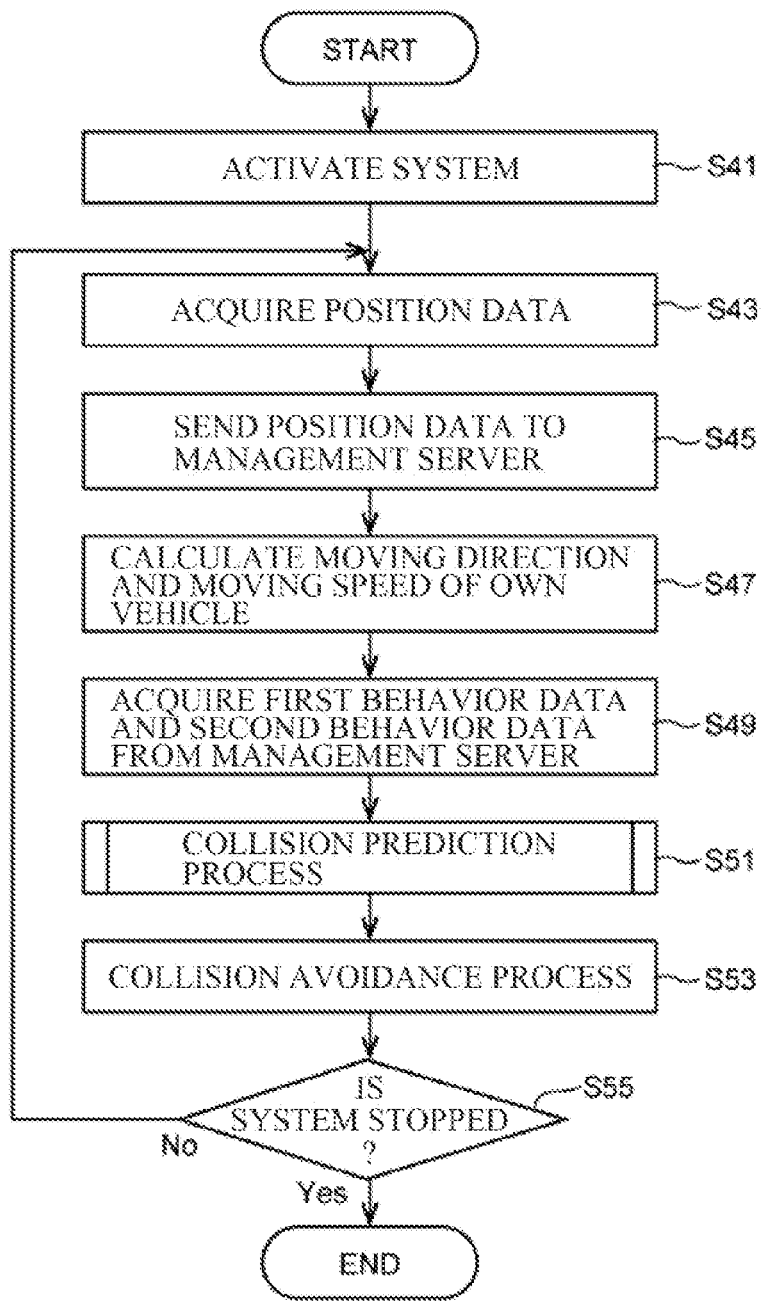
FIG. 10 is a flowchart of a main routine of the processing operation of the driver assistance apparatus of the driver assistance system according to the first embodiment.

FIG. 10 illustrates a flowchart of a main routine of a processing operation of the driver assistance apparatus 50. The flowchart illustrated in FIG. 10 is repeatedly executed bat a predetermined processing cycle.

When an in-vehicle system including the driver assistance apparatus 50 is activated (Step S41), the communication control unit 55 in the processing unit 53 acquires the position data sent from the GNN sensor 37 (Step S43), and send the acquired position data to the management server 110 (Step S45).

Thereafter, the collision risk determination unit 57 determines the moving direction and the moving speed of the vehicle 1 through calculation (Step S47). Specifically, the collision risk determination unit 57 calculates the moving direction and the moving speed of the vehicle 1 on the map data based on a change over time in the position data received from the GNSS sensor 37 at the predetermined processing cycle. In a case where the data on an orientation of the vehicle 1 is included in the position data received from the GNSS sensor 37, the moving direction of the vehicle 1 may be determined based on the data. Further, data detected by the vehicle speed sensor mounted in the vehicle 1 may be acquired as the moving speed of the vehicle 1.

Thereafter, the collision risk determination unit 57 acquires the first behavior data and the second behavior data sent from the management server 110 (Step S49). Accordingly, when the first mobile body, which may be the other vehicle or the like, is detected by the road camera 150, the installation position of the road camera 150 on the map data and the data on the moving direction and moving speed of the mobile body are acquired. Further, when the pedestrian H (second mobile body) holding the portable terminal 130 is present within the predetermined distance from the vehicle 1, the position of the second mobile body on the map data and the information on the moving direction and moving speed of the second mobile body are acquired.

Thereafter, the collision risk determination unit 57 executes a process for predicting a collision of the vehicle 1 (a collision prediction process) based on the data on the position, moving direction, and moving speed of the vehicle 1 and the first and second behavior data acquired (Step S51). Specifically, after the first time when the first behavior data of the first mobile body detected by the road camera 150 is last acquired, the collision risk determination unit 57 predicts a collision between the first mobile body and the vehicle 1 to assist, based on the first behavior data acquired before the first time and the second behavior data acquired from the portable terminal 130 held by the pedestrian H (the second mobile body) or the like.

Figure 11:
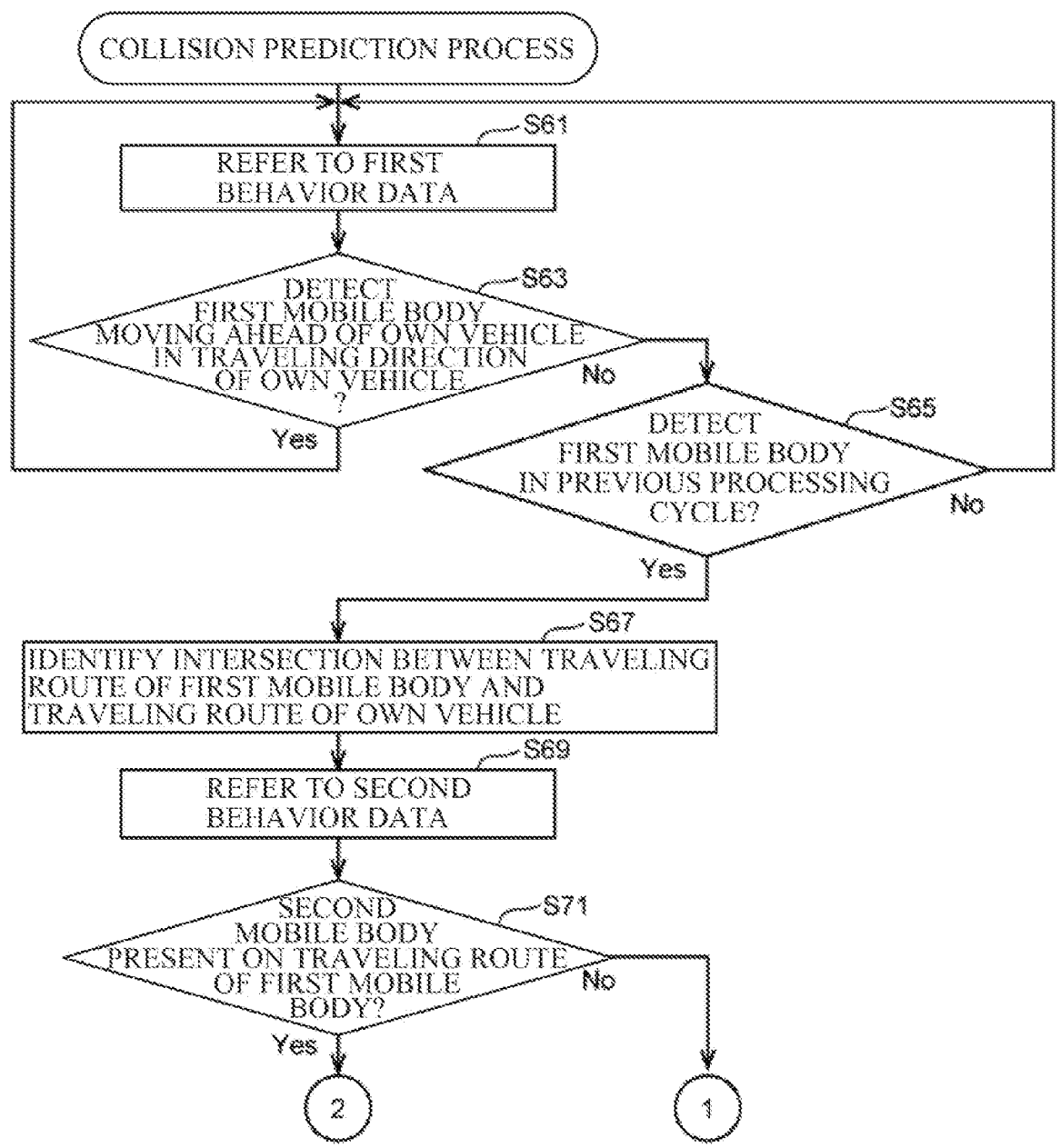
FIG. 11 is a flowchart of a collision prediction process to be performed by the driver assistance apparatus of the driver assistance system according to the first embodiment.
Figure 12:
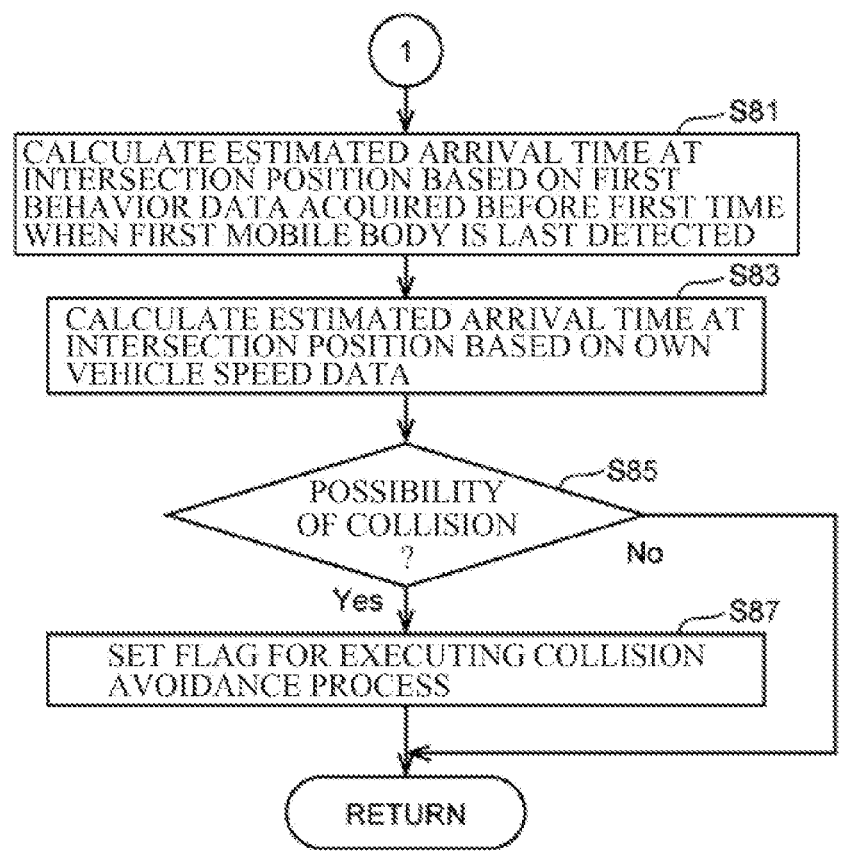
FIG. 12 is a flowchart of the collision prediction process to be performed by the driver assistance apparatus of the driver assistance system according to the first embodiment.
Figure 13:
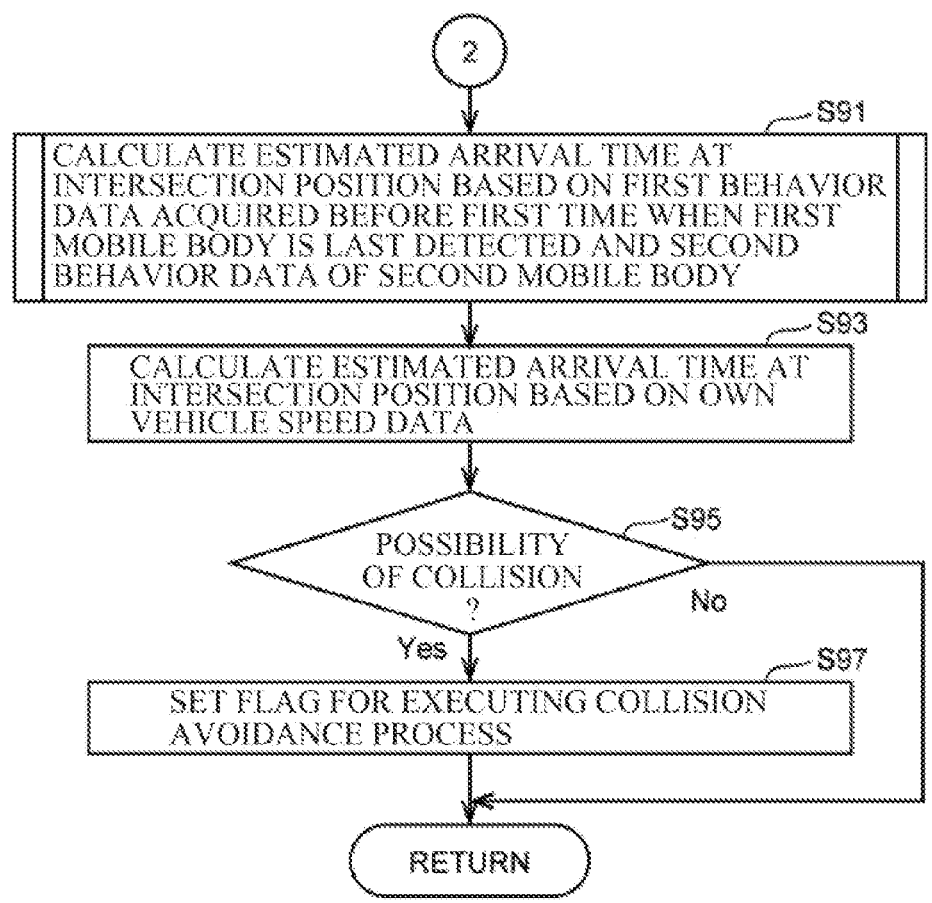
FIG. 13 is a flowchart of the collision prediction process to be performed by the driver assistance apparatus of the driver assistance system according to the first embodiment.

FIGS. 11 to 13 are flowcharts illustrating a specific example of the collision prediction process.

First, the collision risk determination unit 57 refers to the first behavior data acquired from the management server 110 (Step S61). Thereafter, the collision risk determination unit 57 determines whether the first mobile body moving ahead of the vehicle 1 in the moving direction of the vehicle 1 has been detected based on the first behavior data (Step S63). Specifically, the collision risk determination unit 57 determines whether a mobile body moving ahead of the vehicle 1 in the moving direction of the vehicle 1 on a road on the map data extending ahead of the road on which the vehicle 1 is traveling in the moving direction has been detected based on the position and moving direction of the mobile body indicated by the first behavior data.

If the first mobile body moving ahead of the vehicle 1 in the moving direction of the vehicle 1 has been detected (S63: Yes), the collision risk determination unit 57 continues to monitor the first behavior data as the mobile body is still present at the installation position of the road camera 150 although moving ahead of the vehicle 1 in the moving direction of the vehicle 1, and the mobile body thus has no possibility of a collision with the vehicle 1 in an immediate time. In contrast, if the first mobile body moving ahead of the vehicle 1 in the moving direction of the vehicle 1 has not been detected (S63: No), the collision risk determination unit 57 determines whether the first mobile body moving ahead of the vehicle 1 in the moving direction of the vehicle 1 was detected in the previous processing cycle (Step S65). If the first mobile body moving ahead of the vehicle 1 in the moving direction of the vehicle 1 was not detected in the previous processing cycle (S65: No), the collision risk determination unit 57 continues to monitor the first behavior data as the possibility of the absence of the mobile body moving ahead of the vehicle 1 in the moving direction of the vehicle 1 is high.

In contrast, if the first mobile body moving ahead of the vehicle 1 in the moving direction of the vehicle 1 was detected in the previous processing cycle (S65: Yes), the collision risk determination unit 57 identifies an intersection position between the traveling route of the first mobile body and the traveling route of the vehicle 1 (Step S67). Specifically, the collision risk determination unit 57 identifies the traveling route of the mobile body based on the traveling direction of the first mobile body on the map data, identifies the traveling route of the vehicle 1 based on the traveling direction of the vehicle 1, and identifies the point where the two traveling routes intersect with each other.

Thereafter, the collision risk determination unit 57 refers to the second behavior data acquired from the management server 110 (Step S69). Thereafter, the collision risk determination unit 57 determines whether the second mobile body holding the portable terminal 130 is present on the traveling route of the first mobile body based on the second behavior data (Step S71). Here, it is determined whether the position of the portable terminal 130 included in the second behavior data is present on the road of the traveling route of the first mobile body.

The second mobile body is not present on the traveling route of the first mobile body (S71: No), the collision risk determination unit 57 calculates arrival time of the first mobile body at the intersection position based on the first behavior data of the first mobile body acquired before the first time when the first mobile body is last detected by the road camera 150 (Step S81). Specifically, the collision risk determination unit 57 calculates the estimated arrival time by determining required time by dividing the distance from the installation position of the road camera 150 to the intersection position by the moving speed assuming that the moving speed of the first mobile body at the time of passing through the installation position of the road camera 150 is maintained as it is, and adding the required time to the first time.

Thereafter, the collision risk determination unit 57 calculates arrival time of the vehicle 1 at the intersection position based on the moving speed of the vehicle 1 (Step S83). Specifically, the collision risk determination unit 57 calculates the estimated arrival time by determining required time by dividing the distance from the position of the vehicle 1 at the first time to the intersection position by the moving speed of the vehicle 1, and adding the required time to the first time.

Thereafter, the collision risk determination unit 57 determines whether there is a possibility of a collision between the first mobile body and the vehicle 1 (Step S85). Specifically, the collision risk determination unit 57 determines that there is the possibility of a collision between the first mobile body and the vehicle 1 when the difference between the estimated arrival time of the first mobile body calculated in Step S81 and the estimated arrival time of the vehicle 1 calculated in Step S83 is within a predetermined time difference range. The predetermined time difference range may be set to a desired value, taking into consideration a change in speed of the first mobile body or the vehicle 1 or so as not to make the drivers feel dangerous even when no collision will occur.

If there is the possibility of a collision between the first mobile body and the vehicle 1 (S85: Yes), the collision risk determination unit 57 sets a flag for executing a collision avoidance process (Step S87), and ends the collision prediction process. In contrast, there is no possibility of a collision between the first mobile body and the vehicle 1 (S85: No), the collision risk determination unit 57 ends the collision prediction process as it is.

In contrast, if it is determined in Step S71 described above that the second mobile body is present on the traveling route of the first mobile body (S71: Yes), the collision risk determination unit 57 calculates arrival time of the first mobile body at the intersection position based on the first behavior data of the first mobile body and the second behavior data of the second mobile body (Step S91). Specifically, the collision risk determination unit 57 calculates the arrival time of the first mobile body at the intersection position based on the first behavior data of the first mobile body acquired before the first time when the first mobile body is last detected by the road camera 150, and the second behavior data of the second mobile body acquired after the first time.

Figure 14:
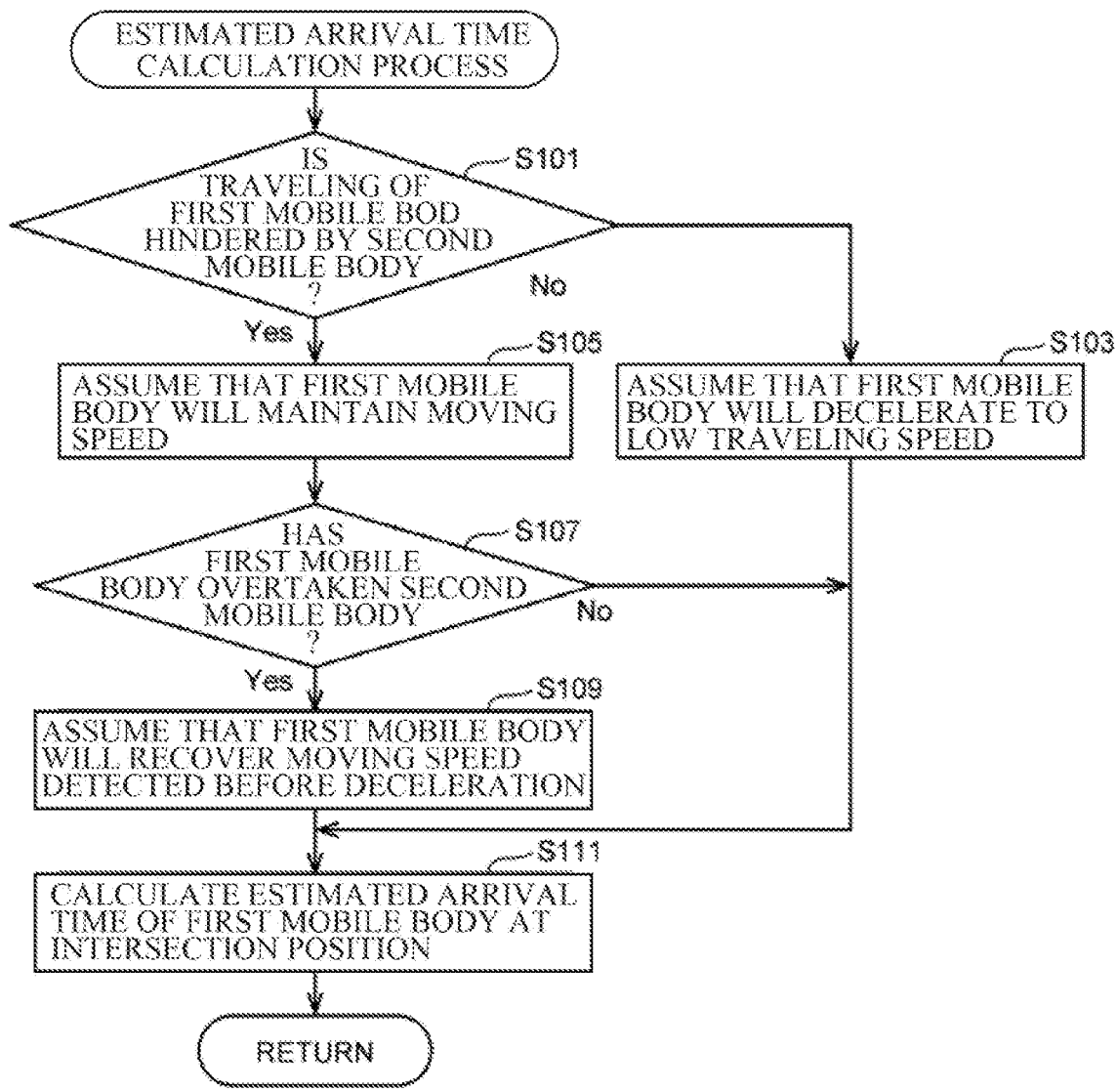
FIG. 14 is a flowchart of a process for calculating an estimated arrival time of a first mobile body at an intersection position to be performed by the driver assistance apparatus of the driver assistance system according to the first embodiment.

FIG. 14 is a flowchart illustrating an example of a process for calculating the estimated arrival time of the first mobile body at the intersection position when the second mobile body is present on the traveling route of the first mobile body.

After the first time when the first mobile body is detected by the road camera 150, the collision risk determination unit 57 determines whether traveling of the first mobile body will be hindered by the second mobile body based on the second behavior data of the second mobile body (Step S101). For example, the collision risk determination unit 57 determines that traveling of the first mobile body will be hindered by the second mobile body when the second mobile body will enter the route which the first mobile body will pass through or when the second mobile body is moving in a direction intersecting with the route which the first mobile body will pass through.

In this case, the collision risk determination unit 57 may determine that traveling of the first mobile body will be hindered by the second mobile body when it is predicted based on the moving speed and moving direction of the second mobile body, and the moving speed and moving direction of the first mobile body detected by the road camera 150 that the second mobile body will enter the area which the first mobile body is going to pass through at the same time as estimated time of the first mobile body passing through the area. The estimated time of the first mobile body passing through each point may be estimated based on the moving speed and an elapsed time of the first mobile body. Likewise, the predicted route of the second mobile body may be predicted based on the moving speed, moving direction, and moving time of the second mobile body.

If it is not determined that traveling of the first mobile body will be hindered by the second mobile body (S101: No), the collision risk determination unit 57 proceeds to Step S111 assuming that the first mobile body will maintain the moving speed detected while the first mobile body is detected by the road camera 150 without accelerating or decelerating. In this case, the collision risk determination unit 57 calculates the estimated arrival time by determining required time by diving the distance from the position of the first mobile body at the first time to the intersection position by the moving speed, and adding the required time to the first time (Step S111).

In contrast, if it is determined that traveling of the first mobile body will be hindered by the second mobile body (S101: Yes), the collision risk determination unit 57 assumes that the first mobile body will begin to decelerate at a predetermined deceleration rate to a predetermined low traveling speed (Step S105). The predetermined deceleration rate may be set based on the distance from the first mobile body at the time of beginning of deceleration to the second mobile body. In this case, the deceleration rate is set to a larger value as the distance from the first mobile body to the second mobile body is shorter. In addition, the predetermined low traveling speed may be set based on the width of the road on which the first mobile body is traveling. In this case, the low traveling speed is set to a smaller value as the width of the road is smaller. Further, the deceleration rate and the low traveling speed may be set on the basis of the moving speed of the first mobile body based on statistical data which is the collection of general deceleration timings.

Thereafter, the collision risk determination unit 57 determines whether the first mobile body has overtaken the second mobile body (Step S107). Specifically, the collision risk determination unit 57 determines that the first mobile body has overtaken the second mobile body when the position of the first mobile boy which is estimated by the traveling speed of the first mobile body detected while the first mobile body is detected by the road camera 150, the deceleration rate and low traveling speed assumed in Step S105, and the traveling time at each moving speed, passes through the position of the second mobile body identified as the position data of the portable terminal 130 which changes over time.

If the first mobile body has not overtaken the second mobile body yet (S107: No), the collision risk determination unit 57 calculates the estimated arrival time of the first mobile body at the intersection position assuming that the first mobile body will continue moving while decelerating (Step S111). Specifically, the collision risk determination unit 57 subtracts the moving distance obtained by multiplying the moving speed of the first mobile body detected while the first mobile body is detected by the road camera 150 by the moving distance at the moving speed from the distance from the first mobile body at the first time to the intersection position to thereby calculate a remaining distance. The collision risk determination unit 57 then calculates the time required to travel the remaining distance at the deceleration rate and the low traveling speed assumed in Step S105. Thereafter, the collision risk determination unit 57 adds the sum of the time of the movement at the moving speed before the deceleration and the required time after deceleration to the first time to thereby calculate the estimated arrival time.

In contrast, when the first mobile body has overtaken the second mobile body (S107: Yes), the collision risk determination unit 57 assumes that the first mobile body will accelerate to recover the moving speed detected before the deceleration after second time when the first mobile body overtakes the second mobile body (Step S109). The acceleration rate at this time may be a predetermined constant acceleration rate or any acceleration rate determined based on the moving speed after the recovery. In addition, when information indicating the tendency of the acceleration rate of the first mobile body is acquired from the first behavior data of the first mobile body detected by the road camera 150, the acceleration rate may be set based on the information.

Thereafter, the collision risk determination unit 57 calculates the estimated arrival time of the first mobile body at the intersection position assuming that the first mobile will decelerate and accelerate after the second time (Step S111). Specifically, the collision risk determination unit 57 calculates the moving distance obtained by multiplying the moving speed of the first mobile body detected while the first mobile body is detected by the road camera 150 by the time for the movement at the moving speed after the first time. In addition, the collision risk determination unit 57 calculates the time for traveling after the second time at the deceleration rate and low traveling speed assumed in Step S109 and the acceleration rate assumed in Step S105, and the moving distance in the time. Further, the collision risk determination unit 57 subtracts the sum of the moving distance of the first mobile body at the moving speed detected while the first mobile body is detected by the road camera 150 and the moving distance of the first mobile body from the start of deceleration to the recovery of the moving speed detected before the deceleration from the distance from the position of the first mobile body at the first time to the intersection position to thereby calculate a remaining distance. The collision risk determination unit 57 divides the remaining distance by the moving speed after the recovery to thereby calculate required time for the remaining distance. Thereafter, the collision risk determination unit 57 adds the sum of the time for the movement at the moving speed before the deceleration, the required time from the start of the deceleration to the recovery of the moving speed before the deceleration, and the required time for traveling in the remaining distance at the moving speed after the recovery to the first time to thereby calculate the estimated arrival time.

Returning to FIG. 13, the collision risk determination unit 57 calculates the estimated arrival time of the vehicle 1 at the intersection position based on the data on the moving speed of the vehicle 1 after calculating the estimated arrival time of the first mobile body at the intersection position (Step S93). Specifically, the collision risk determination unit 57 calculates the estimated arrival time by determining required time by diving the distance from the position of the vehicle 1 at the first time to the intersection position by the moving speed of the vehicle 1, and adding the required time to the first time.

Thereafter, the collision risk determination unit 57 determines whether there is the possibility of a collision between the first mobile body and the vehicle 1 through a procedure similar to Step S85 described above (Step S95). If there is the possibility of a collision between the first mobile body and the vehicle 1 (S95: Yes), the collision risk determination unit 57 sets the flag for executing the collision avoidance process (Step S97), and ends the collision prediction process. In contrast, when there is no possibility of a collision between the first mobile body and the vehicle 1 (S95: No), the collision risk determination unit 57 ends the collision prediction process as it is.

Returning to FIG. 10, the driving control unit 59 executes the collision avoidance process (Step S53) after the execution of the collision prediction process in Step S51. Specifically, the driving control unit 59 executes the process to avoid the collision between the vehicle 1 and the first mobile body when the flag for executing the collision avoidance process is set as a result of the collision prediction process. For example, the driving control unit 59 may avoid the collision between the vehicle 1 and the first mobile body by decelerating the vehicle 1 and thus delaying the arrival time of the vehicle 1 at the intersection position. Alternatively, in a case where the width of the road on which the vehicle 1 is traveling is large or where there are multiple lanes, the driving control unit 59 may avoid the collision between the vehicle 1 and the first mobile body by changing the traveling track of the vehicle 1 instead of decelerating the vehicle 1 or along with decelerating the vehicle 1. The driving control unit 59 sets a command value of the deceleration rate and a command value of a steering angle of the vehicle 1, and sends the command values to the vehicle control unit 41.

As described above, after the first time when the first mobile body unable to communicate with the vehicle 1 to assist is no longer detected by the road camera 150, the driver assistance apparatus 50 estimates the estimated arrival time of the first mobile body at the intersection position, taking into consideration not only the moving speed detected while the first mobile body is detected by the road camera 150 but also the deceleration and acceleration of the first mobile body due to the second mobile body present on the traveling road. Accordingly, it is possible to enhance accuracy in predicting a collision between the vehicle 1 and the first mobile body.

<1-6. Application Example>

The driver assistance system 100 according to the first embodiment has been described. In the following, a description is given of an example to which the driver assistance system 100 according to the first embodiment is applied.

FIGS. 15 to 18 are explanatory diagrams for explaining an application example of the driver assistance system 100 according to the first embodiment. In the application example described below, a traveling scene is described where the vehicle 1, serving as the target to assist, and another vehicle 90, serving as the first mobile body, are each traveling toward an intersection C.

Figure 15:
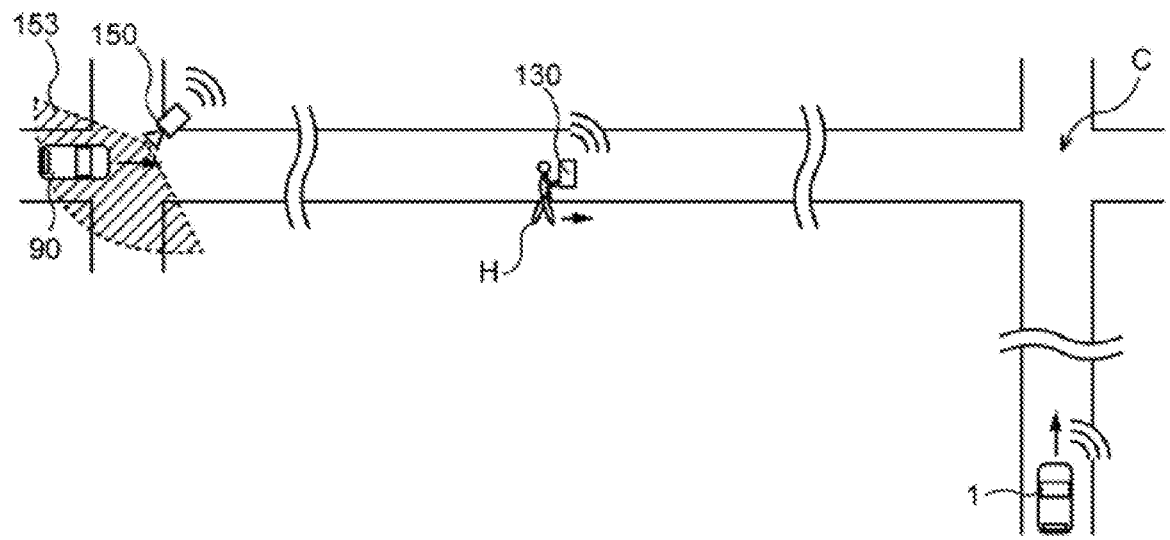
FIG. 15 is an explanatory diagram illustrating an application example of the first embodiment.

As illustrated in FIG. 15, the other vehicle 90 is traveling toward the intersection C located in front of the vehicle 1 in the traveling direction. In FIG. 15, the other vehicle 90 is present within an imaging range 153 of the road camera 150 serving as the environment recognition device, and is thus recognized by the road camera 150. In the application example, it is assumed that arrival time of the other vehicle 90 maintaining a current moving speed at the intersection C overlaps arrival time of the vehicle 1 at the intersection C, and thus there is a possibility of a collision between the other vehicle 90 and the vehicle 1 to assist. A pedestrian H holding the portable terminal 130 and serving as the second mobile body is present in front of the other vehicle 90 in the traveling direction.

Figure 16:
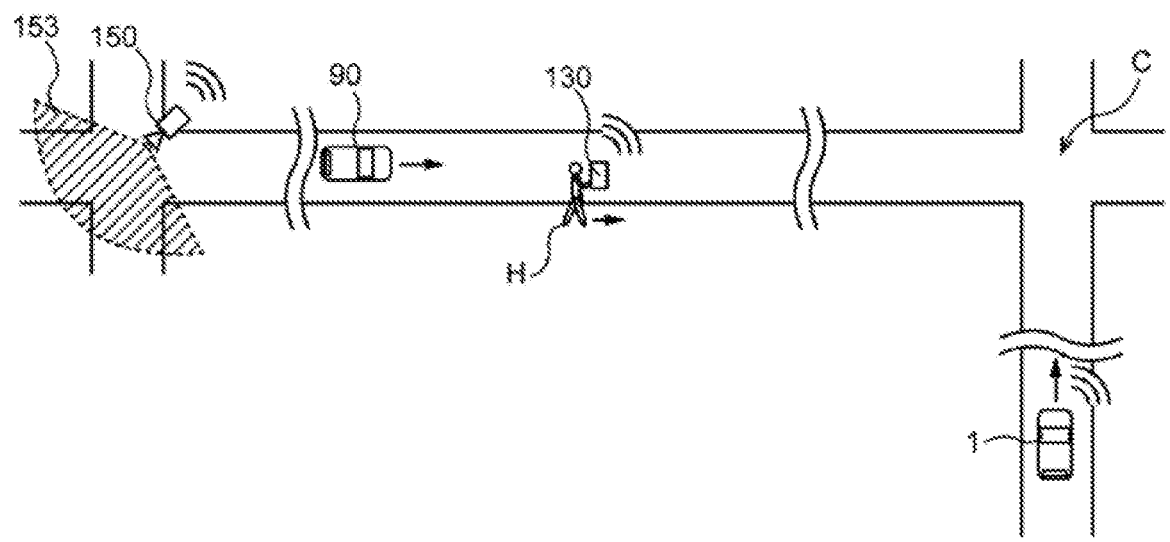
FIG. 16 is an explanatory diagram illustrating an application example of the first embodiment.
Figure 17:
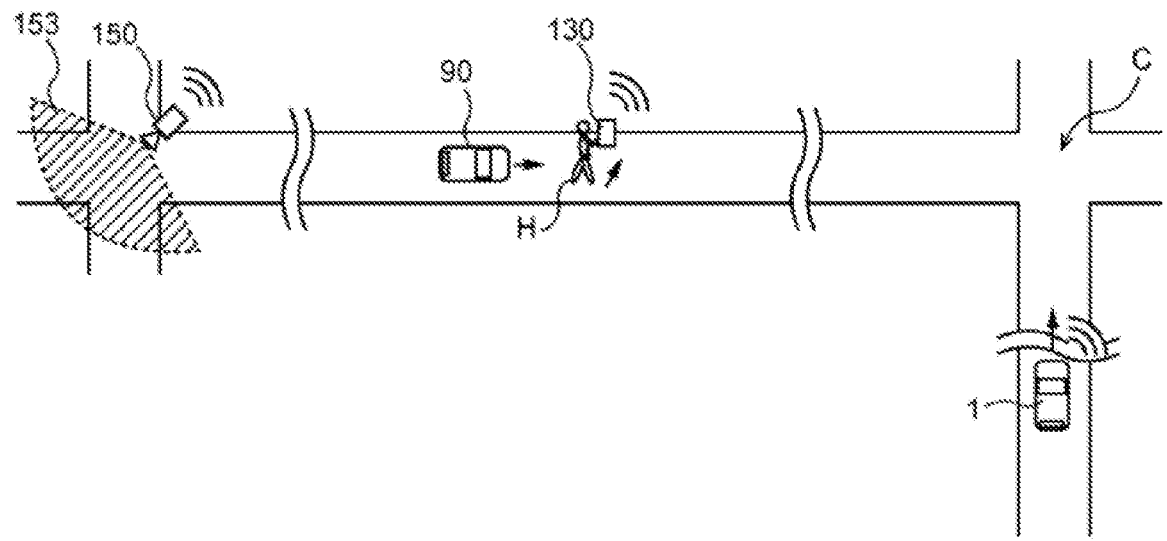
FIG. 17 is an explanatory diagram illustrating an application example of the first embodiment.
Figure 18:
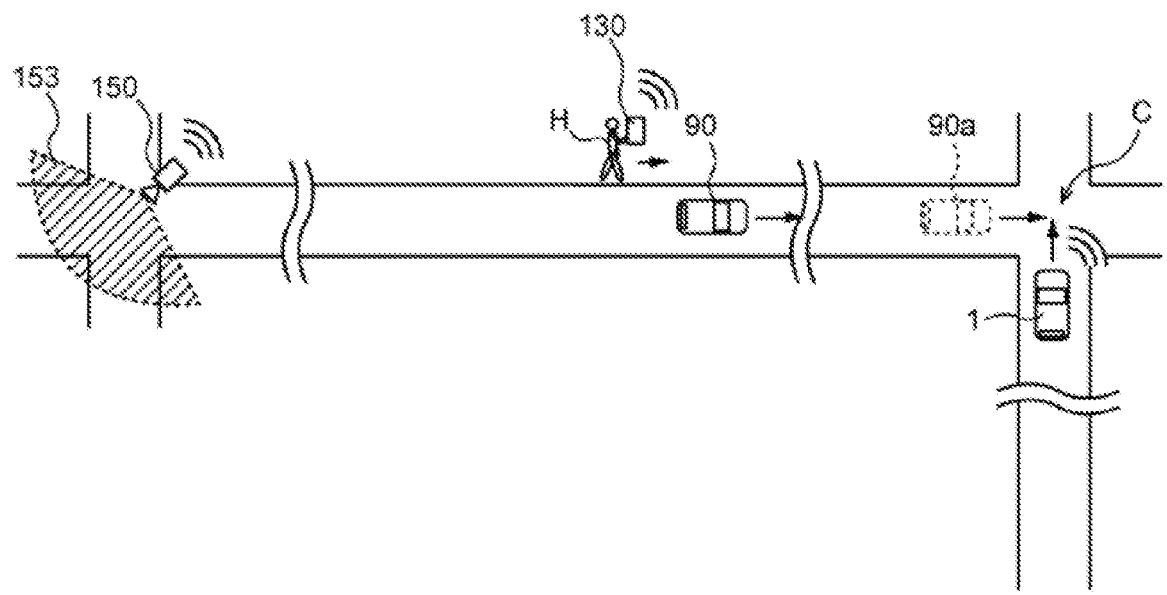
FIG. 18 is an explanatory diagram illustrating an application example of the first embodiment.

In FIG. 16, the other vehicle 90 is moving toward the intersection C and present out of the imaging range 153 of the road camera 150. In the state illustrated in FIG. 16, the pedestrian H is moving on a side of the road, and is thus not hindering traveling of the other vehicle 90. In FIG. 17, the pedestrian H is entering the route on which the other vehicle 90 is traveling. The other vehicle 90 decelerates to avoid a collision with the pedestrian H. In FIG. 18, the pedestrian H has crossed an area in front of the other vehicle 90, and the other vehicle 90 is overtaking the pedestrian H. The other vehicle 90 accelerates as there is no pedestrian H in front.

In these traveling scenes, in a case where the driver assistance apparatus of the vehicle 1 to assist calculates estimated arrival time of the other vehicle 90 at the intersection C based on the moving speed of the other vehicle 90 detected by the road camera 150 and the distance from the installation position of the road camera 150 to the intersection C without taking into consideration the information on the pedestrian H, a time difference between the estimated arrival time of the vehicle 1 at the intersection C and the estimated arrival time of the other vehicle 90 at the intersection C is less than or equal to a predetermined time difference. In this case, the driver assistance apparatus predicts that a collision between the other vehicle 90 (other vehicle 90a illustrated with a broken line in FIG. 18) and the vehicle 1 to assist will occur. Accordingly, the driver assistance apparatus decelerates the vehicle 1 to assist or changes the route of the vehicle 1 even though the other vehicle 90 has not actually arrived at the intersection C yet. This makes an occupant, such as a driver, of the vehicle 1 to assist become distrustful.

In contrast, the driver assistance apparatus 50 according to the embodiment assumes that the other vehicle 90 will decelerate when it is determined that traveling of the other vehicle 90 will be hindered by the pedestrian H, and assumes that the other vehicle 90 will recover the moving speed detected before the deceleration after overtaking the pedestrian H. Accordingly, the time difference between the estimated arrival time of the other vehicle 90 at the intersection C and the estimated arrival time of the vehicle 1 to assist at the intersection C exceeds the predetermined time difference. In this case, the driver assistance apparatus 50 predicts that a collision between the other vehicle 90 and the vehicle 1 to assist will not occur. Accordingly, the driver assistance apparatus 50 prevents the occupant, such as the driver, of the vehicle 1 to assist from becoming distrustful without decelerating the vehicle 1 to assist or changing the route of the vehicle 1.

<1-7. Effects>

As described above, according to the driver assistance system 100 of the first embodiment of the disclosure, the driver assistance apparatus 50 acquires the first behavior data of the first mobile body detected by the road camera 150, which is provided separately from the first mobile body, via the management server 110. Further, the driver assistance apparatus 50 acquires the second behavior data of the second mobile body present on the route on which the first mobile body is scheduled to travel and holding the portable terminal 130 that sends own behavior data to the vehicle 1 to assist via the management server 110. In addition, after the first time when the first mobile body is last detected by the road camera 150, the driver assistance apparatus 50 predicts a collision between the first mobile body and the vehicle 1 to assist, based on the first behavior data of the first mobile body acquired before the first time and the second behavior data of the second mobile body acquired from the portable terminal 130. Accordingly, even if the first mobile body does not include an inter-vehicle communication means, a road-to-vehicle communication means, or the like, it is possible to predict a collision between the first mobile body and the vehicle 1 to assist, taking into consideration deceleration and acceleration of the first mobile body after the time when the vehicle 1 to assist becomes unable to acquire the first behavior data of the first mobile body.

Accordingly, it is possible to reduce the risk of a collision between the first mobile body unable to send own behavior data to the vehicle to assist and the vehicle 1 to assist at an intersection. In addition, it is possible to prevent the vehicle 1 from being decelerated or changed in the route even though there is no possibility of a collision between the vehicle 1 to assist and the first mobile body, preventing the occupant, such as the driver, of the vehicle 1 from becoming distrustful. Further, it is possible to reduce the risk of exposing the vehicle 1 to assist to danger caused by an erroneous determination that there is no possibility of a collision even though there is the possibility of a collision between the vehicle 1 to assist and the first mobile body.

Further, when it is determined that traveling of the first mobile body will be hindered by the second mobile body, the driver assistance apparatus 50 of the driver assistance system 100 according to the first embodiment estimates a change in the moving speed of the first mobile body assuming that the first mobile body will decelerate. Accordingly, it is possible to predict a collision between the first mobile body and the vehicle 1 to assist, taking into consideration a delay in arrival of the first mobile body at the intersection position due to the second mobile body.

Further, the driver assistance apparatus 50 of the driver assistance system 100 according to the first embodiment determines that traveling of the first mobile body will be hindered by the second mobile body when it is predicted that the second mobile body will enter an area which the first mobile body is going to pass through at the same time as the estimated time of passing of the first mobile body. Accordingly, it is possible to predict a collision between the first mobile body and the vehicle 1 to assist not only simply assuming that the second mobile body is present on the traveling route of the first mobile body but also predicting a specific situation where the first mobile body will decelerate.

Further, the driver assistance apparatus 50 of the driver assistance system 100 according to the first embodiment predicts a collision between the first mobile body and the vehicle 1 to assist, assuming that the first mobile body will recover the speed detected before decelerating after the second time when it is estimated that the first mobile body overtakes the second mobile body. Accordingly, it is possible to predict a collision between the first mobile body and the vehicle 1 to assist, taking into consideration the acceleration of the first mobile body after overtaking the second mobile body.

2. Second Embodiment

Next, a description is given of a driver assistance system according to a second embodiment.

In the driver assistance system according to the second embodiment, the second mobile body is configured to send one or both of an own surrounding sound and own biological information directly or via an external server to the vehicle to assist when being present on the traveling route of the first mobile body. In this case, the biological information of the second mobile body is biological information of a pedestrian or biological information of an occupant of a mobile body such as a car. The vehicle to assist estimates the position of the first mobile body using the surrounding sound or the biological information of the second mobile body in addition to the second behavior data, and predicts a collision between the first mobile body and the vehicle to assist. In the following, descriptions are given mainly of differences between the driver assistance system according to the first embodiment and the driver assistance system according to the second embodiment.

<2-1. Basic Configuration of Driver Assistance System>

A basic configuration of the driver assistance system according to the second embodiment may be similar to the basic configuration of the driving assistance system according to the first embodiment illustrated in FIG. 1.

A functional configuration of the environment recognition device (the road camera 150) of the driver assistance system according to the second embodiment may be the same as that of the environment recognition device of the driver assistance system according to the first embodiment. The portable terminal 130 may be the same as the portable terminal 130 of the driver assistance system according to the first embodiment except that the portable terminal 130 according to the second embodiment includes a microphone array that collects surrounding sounds and a biological sensor that detects the biological information of the second mobile body, and is configured to send a collected sound waveform detected and the biological information to the management server 110. The management server 110 may be the same as the management server 110 of the driver assistance system according to the first embodiment except that the management server 110 is configured to acquire the collected sound waveform and the biological information sent from the portable terminal 130 and send them to the driver assistance apparatus 50. The driver assistance apparatus 50 predicts a collision between the first mobile body and the vehicle to assist based on the surrounding sound and biological information of the second mobile body in addition to the first behavior data of the first mobile body and the second behavior data of the second mobile body.

Note that, although the example in which the portable terminal 130 includes the microphone array and the biological sensor is described in the second embodiment, only one of the microphone array and the biological sensor may be provided.

<2-2. Portable Terminal>

Figure 19:
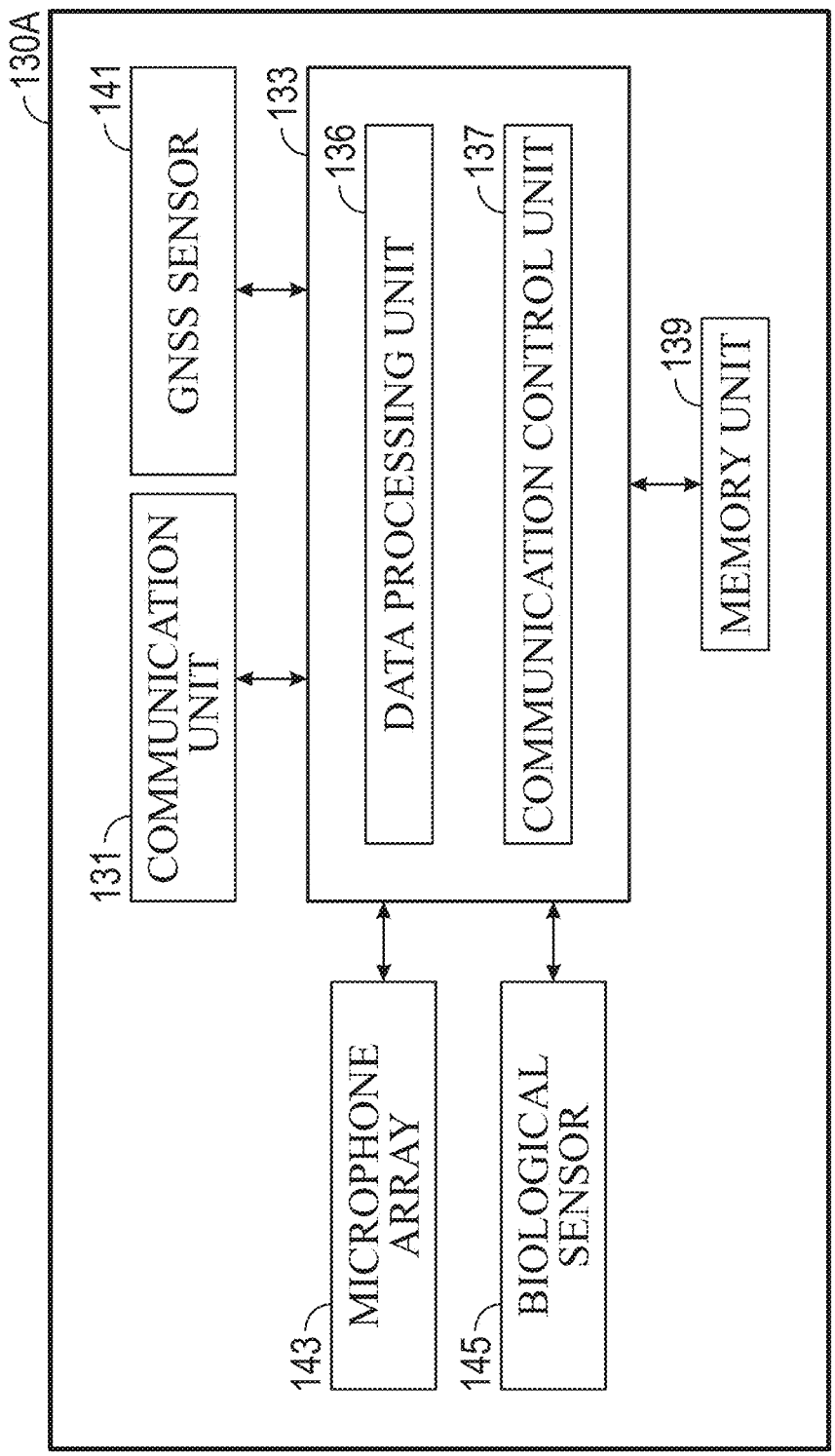
FIG. 19 is a block diagram illustrating a configuration example of a portable terminal of a driver assistance system according to a second embodiment of the disclosure.

FIG. 19 is a block diagram illustrating a functional configuration of a portable terminal 130A.

The portable terminal 130 A includes a communication unit 131, a processing unit 133, a memory unit 139, a GNSS sensor 141, a microphone array 143, and a biological sensor 145. Among these components, the communication unit 131, the memory unit 139, and the GNSS sensor 141 may have similar functions to those of the portable terminal 130 of the driver assistance system according to the first embodiment.

The microphone array 143 outputs a surrounding sound of the portable terminal 130A as waveform data to the processing unit 133. The biological sensor 145 may be, for example, a wearable or non-wearable sensor that detects a heart rate or a pulse of a mobile body. Alternatively, the biological sensor 145 may be a sensor having a function that detects biological information such as a blood pressure or a body temperature of the second mobile body. Further, the biological sensor 145 may be disposed on the body of the portable terminal 130A, or may be provided in a wearable device communicably coupled to the processing unit 133 of the portable terminal 130A. In this case, the biological sensor 145 may be configured to communicate with the processing unit 133 via a wireless communication means such as Bluetooth (registered trademark), near field communication (NFC), wireless fidelity (WiFi), or a local area network (LAN).

The processing unit 133 includes one or more CPUs. The processing unit 133 acquires position data of the portable terminal 130A at a predetermined processing cycle, and determines a moving speed and a moving direction of the portable terminal 130. Further, the processing unit 133 acquires waveform data on the surrounding sound (collected sound waveform) of the portable terminal 130A and the biological information of the second mobile body at a predetermined processing cycle. Further, the processing unit 133 sends the information acquired at the respective predetermined processing cycles and information on results of calculations to the management server 110. The memory unit 139 includes one or more memories. The memory unit 139 stores computer programs to be executed by the processing unit 133, various parameters to be used in calculation processes, and information on the results of calculations. The memory unit 139 may be a memory element such as a RAM or a ROM, a flash memory such as an SSD, or another recording medium.

The processing unit 133 includes a data processing unit 136 and a communication control unit 137. Functions of these components are implemented by processors executing computer programs. The data processing unit 136 determines the moving speed and the moving direction of the portable terminal 130 through calculation based on the position data received from the GNSS sensor 141 at a predetermined processing cycle. For example, the data processing unit 135 may calculate the moving speed and the moving direction of the portable terminal 130 based on a change over time in the position data received at the predetermined processing cycle.

The communication control unit 137 sends the position data of the portable terminal 130 received from the GNSS sensor 141, the information on the moving speed and moving direction of the portable terminal 130 determined by the data processing unit 135, and the collected sound waveform and biological information of the second mobile body all together to the management server 110.

Figure 20:
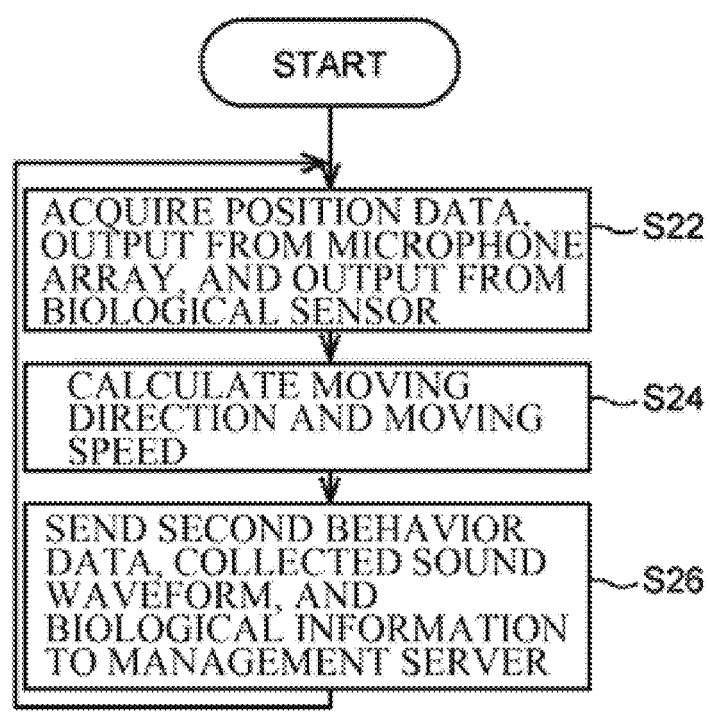
FIG. 20 is a flowchart of a processing operation of the portable terminal of the driver assistance system according to the second embodiment.
Figure 21:
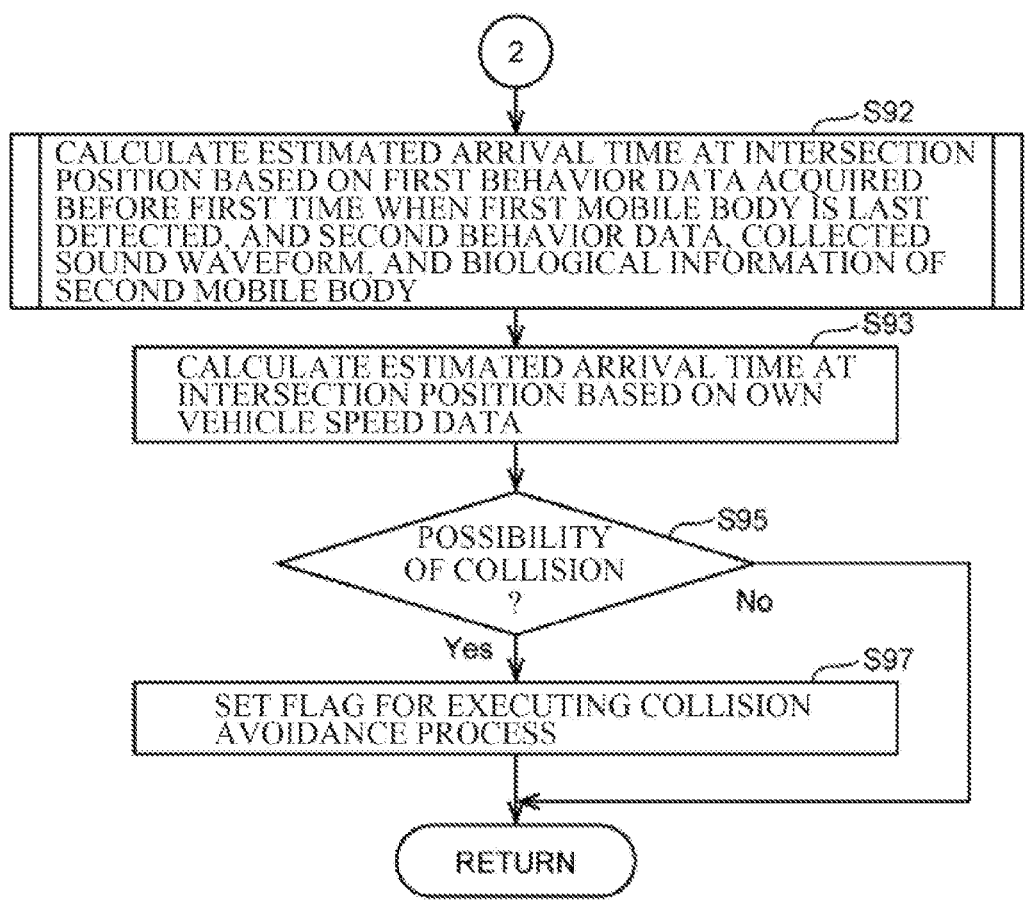
FIG. 21 is a flowchart of a collision prediction process to be performed by a driver assistance apparatus of the driver assistance system according to the second embodiment.

FIG. 20 illustrates a flowchart of a processing operation of the portable terminal 130A. The flowchart illustrated in FIG. 20 is repeatedly executed at a predetermined processing cycle.

The data processing unit 136 of the processing unit 133 acquires the position data received from the GNSS sensor 141, the waveform data received from the microphone array 143, and the biological information received from the biological sensor 145 (Step S22). Thereafter, the data processing unit 136 determines the moving direction and moving speed of the portable terminal 130 through calculation based on the position data acquired, through a procedure similar to Step S23 described in the first embodiment (Step S24).

Thereafter, the communication control unit 137 sends the position data acquired from the GNSS sensor 141, the data on the moving speed and moving direction calculated, the collected sound waveform acquired, and the biological information to the management server 110 (Step S26). The portable terminal 130A repeatedly executes the processes at Steps S22 to S26 described above at a predetermined processing cycle.

Note that the second mobile body holding the portable terminal 130 is not limited to a pedestrian, and may be a vehicle, a motorcycle, a bicycle, or another object that moves at a predetermined moving speed.

<2-3. Driver Assistance Apparatus>

A basic functional configuration of the driver assistance apparatus of the driver assistance system according to the second embodiment and a configuration of a vehicle to which the driver assistance apparatus is applicable may be the same as the functional configuration of the driver assistance apparatus according to the first embodiment and the configuration of the vehicle to which the driver assistance apparatus according to the first embodiment is applicable. In the following, a description is given of a processing operation of the driver assistance apparatus of the driver assistance system according to the second embodiment.

A main routine of the processing operation of the driver assistance apparatus 50 may be similar to that of the processing operation of the driver assistance apparatus of the driver assistance system according to the first embodiment illustrated in FIG. 10. However, the content of the process for predicting a collision between the first mobile body and the vehicle 1 to assist is different from that in the first embodiment. Thus, the collision prediction process to be performed by the driver assistance apparatus 50 according to the second embodiment is described below with reference to FIGS. 11, 12, 21, and 22.

The collision risk determination unit 57 executes the processes at Steps S61 to S71 described above with reference to the flowchart illustrated in FIG. 11. Further, if it is determined in Step S71 that the second mobile body is not present on the traveling route of the first mobile body (S71: No), the collision risk determination unit 57 executes the processes at Steps S81 to S87 described above with reference to the flowchart illustrated in FIG. 12.

In contrast, it is determined in Step S71 that the second mobile body is present on the traveling route of the first mobile body (S71: Yes), the collision risk determination unit 57 calculates arrival time of the first mobile body at the intersection position based on the first behavior data of the first mobile body, the second behavior data, collected waveform, and biological information of the second mobile body (Step S92). Specifically, the collision risk determination unit 57 calculates the arrival time of the first mobile body at the intersection position based on the first behavior data of the first mobile body acquired before the first time when the first mobile body is last detected by the road camera 150, and the second behavior data, collected sound waveform, and biological information of the second mobile body acquired after the first time.

Figure 22:
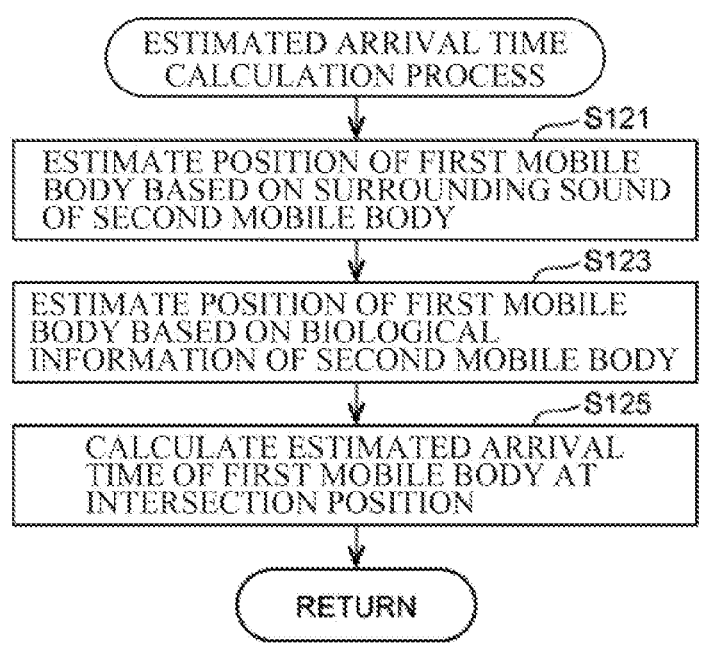
FIG. 22 is a flowchart of the collision prediction process to be performed by the driver assistance apparatus of the driver assistance system according to the second embodiment.

FIG. 22 is a flowchart illustrating an example of the process for calculating the estimated arrival time of the first mobile body at the intersection position when the second mobile body is present on the traveling route of the first mobile body.

The collision risk determination unit 57 estimates a position of the first mobile body based on the acquired waveform data of the surrounding sound of the second mobile body (the collected sound waveform) (Step S121). Specifically, the collision risk determination unit 57 estimates a situation where the first mobile body is approaching the second mobile body or a situation where the first mobile body is moving away from the second mobile body based on the waveform data outputted from the microphone array 143. For example, the collision risk determination unit 57 may determine that the first mobile body is approaching the second mobile body as the surrounding sound of the second mobile body gradually increases in volume, and thereafter may determine that the first mobile body is moving away from the second mobile body as the surrounding sound of the second mobile body gradually decreases in volume. Alternatively, in a case where the microphone array 143 is a microphone array having directivity, the collision risk determination unit 57 may determine that the first mobile body is approaching or moving away from the second mobile body by identifying a moving direction of the sound source based on the collected sound waveform.

Thereafter, the collision risk determination unit 57 estimates the position of the first mobile body based on the acquired biological information of the second mobile body (Step S123). When a pedestrian or a bicycle corresponding to the second mobile body crosses or passes across an area in front of the first mobile body, the second mobile body is brought into a tense (nervous) state depending on the proximity of the second mobile body to the first mobile body, which is supposed to affect the biological information of the second mobile body. Accordingly, the collision risk determination unit 57 monitors the biological information of the second mobile body, and determines that the first mobile body is present within a predetermined range from the second mobile body when the second mobile body exhibits an abrupt increase in the heart rate, pulse rate, blood pressure, or biological reaction. The predetermined range may be set to any appropriate value preliminarily determined.

Thereafter, the collision risk determination unit 57 calculates the estimated arrival time of the first mobile body at the intersection position where the first mobile body will encounter the vehicle 1 to assist, taking into consideration the position of the first mobile body estimated in Step S121 or Step S123 (Step S125). Specifically, the collision risk determination unit 57 calculates basic required time by dividing the distance from the position of the first mobile body at the first time to the intersection position by the moving speed of the first mobile body detected while the first mobile body is detected by the road camera 150. Further, when it is estimated in Step S121 or Step S125 that the first mobile body is approaching the second mobile body, the collision risk determination unit 57 determines the distance from the position of the first mobile body at the first time to the position of the second mobile body based on the position data of the second mobile body at the estimation timing. In addition, the collision risk determination unit 57 calculates an average moving speed to the position where the first mobile body approaches the second mobile body by dividing the determined distance value by the required time from the first time to the time when the first mobile body approaches the second mobile.

Thereafter, the collision risk determination unit 57 divides a remaining distance from the position where the first mobile body approaches the second mobile body to the intersection position by the average moving speed to thereby determine remaining required time, and adds the sum of the required time to the first time to thereby calculate the estimated arrival time of the first mobile body at the intersection position.

Returning to FIG. 21, after calculating the estimated arrival time of the first mobile body at the intersection position, the collision risk determination unit 57 predicts a collision between the first mobile body and the vehicle 1 to assist, following the processes at Steps S93 to S97 of the flowchart illustrated in FIG. 13, following which the collision prediction process ends. Thereafter, in a case where the collision between the first mobile body and the vehicle 1 to assist is predicted following the flowchart illustrated in FIG. 10 and where the flag for executing the collision avoidance process is set, the driving control unit 59 executes the collision avoidance process in Step S53.

<2-4. Effects>

As described above, according to the driver assistance system of the second embodiment of the disclosure, the driver assistance apparatus 50 acquires the first behavior data of the first mobile body detected by the road camera 150, which is provided separately from the first mobile body, via the management server 110. Further, the driver assistance apparatus 50 acquires the second behavior data, collected sound waveform, and biological information of the second mobile body present on the route on which the first mobile body is scheduled to travel and holding the portable terminal 130 that sends own behavior data to the vehicle 1 to assist via the management server 110. In addition, after the first time when the first mobile body is last detected by the road camera 150, the driver assistance apparatus 50 predicts a collision between the first mobile body and the vehicle 1 to assist, based on the first behavior data of the first mobile body acquired before the first time, the second behavior data, the collected sound waveform, and the biological information of the second mobile body acquired from the portable terminal 130. Accordingly, even if the first mobile body does not include an inter-vehicle communication means, a road-to-vehicle communication means, or the like, it is possible to predict a collision between the first mobile body and the vehicle 1 to assist, taking into consideration deceleration and acceleration of the first mobile body after the time when the vehicle 1 to assist becomes unable to acquire the first behavior data of the first mobile body.

Accordingly, it is possible to reduce the risk of a collision between the first mobile body unable to send own behavior data to the vehicle to assist and the vehicle 1 to assist at an intersection. In addition, it is possible to prevent the vehicle 1 from being decelerated or changed in the route even though there is no possibility of a collision between the vehicle 1 to assist and the first mobile body, preventing the occupant, such as the driver, of the vehicle 1 from becoming distrustful. Further, it is possible to reduce the risk of exposing the vehicle 1 to assist to danger caused by an erroneous determination that there is no possibility of a collision even though there is the possibility of a collision between the vehicle 1 to assist and the first mobile body.

Further, according to the driver assistance system of the second embodiment, the driver assistance apparatus 50 estimates the position of the first mobile body based on the information on the surrounding sound or the biological information of the second mobile body sent from the portable terminal 130, and predicts a collision between the first mobile body and the vehicle 1 to assist. Accordingly, it is possible to estimate the position of the first mobile body at an intermediate position before the intersection position, after the first time when the first mobile body is last detected by the road camera 150. This enhances accuracy in estimating the estimated arrival time of the first mobile body at the intersection position. Accordingly, it is possible to enhance accuracy in predicting a collision between the first mobile body and the vehicle 1 to assist.

Although preferable embodiments of the disclosure have been described in detail with reference to the accompanying drawings, the technology of the disclosure is not limited to such examples. It is apparent that a person having ordinary knowledge in the field of the technology to which the disclosure pertains can conceive of various alterations or modifications within the scope of the technical concept described in the claims, and the alterations and modifications are naturally understood to be within the technical scope of the disclosure.

For example, in the foregoing embodiments, the driver assistance apparatus mounted in the vehicle to assist executes the process for calculating the estimated arrival time of the first mobile body based on various pieces of information: however, the management server 110 may have a function that calculates the estimated arrival time. In addition, in the foregoing embodiment, the driver assistance apparatus mounted in the vehicle to assist executes the process for predicting a collision between the first mobile body and the vehicle to assist based on various pieces of information; however, the management server 110 may have a function that predicts the collision. Further, other components may have some of the functions of the environment recognition device (the road camera), the portable terminal, the management server, and the driver assistance apparatus described in the foregoing embodiments.

Further, in the foregoing embodiments, the environment recognition device (the road camera) and the portable terminal are each configured to send information to the driver assistance apparatus via the management server: however, the technology of the disclosure is not limited to this example. One or both of the environment recognition device (the road camera) and the portable terminal may be configured to send information directly or via a communication network to the driver assistance apparatus. Even with such a configuration, it is possible to provide effects similar to those in the foregoing embodiment.

Further, in the foregoing embodiments, the example is described in which the first mobile body does not include an inter-vehicle communication means or a road-to-vehicle communication means and is thus unable to communicate with the vehicle to assist; however, the technology of the disclosure is not limited to the example described above. According to the technology of the disclosure, it is possible to predict a collision between the first mobile body and the vehicle to assist even when the first mobile body includes the inter-vehicle communication means and the road-to-vehicle communication means, but these communication means are disabled due to any factor.

DESCRIPTION OF REFERENCE NUMERALS

1: vehicle (vehicle to assist), 50: driver assistance apparatus, 53: processing unit, 55: communication control unit, 57: collision risk determination unit, 59: driving control unit, 90: another vehicle, 90a: another vehicle, 100: driver assistance system, 105: communication network, 110: management server, 113: processing unit, 130: portable terminal, 133: processing unit, 141: GNSS sensor, 143: microphone array, 145: biological sensor, 150: road camera, 151: image generation unit, 153: imaging range, 160: image processor, 163: processing unit, 165: image processing unit, C: intersection, H: pedestrian

The invention claimed is:

1. A driver assistance system that assists driving of a vehicle, the driver assistance system comprising:
   one or more processors; and
   one or more memories communicably coupled to the one or more processors,
   wherein the one or more processors are configured to:
      acquire first behavior data directly or via an external server from an environment recognition device, the first behavior data comprising behavior data of a first mobile body detected by the environment recognition device provided separately from the first mobile body, the first mobile body being different from the vehicle to assist;
      acquire second behavior data, the second behavior data comprising behavior data of a second mobile body, the second mobile body being present in a traveling direction of the first mobile body and comprising a communication means for sending the second behavior data directly or via the external server to the vehicle to assist; and predict, when the first mobile body having been detected by the environment recognition device is no longer detected by the environment recognition device after a time point at which the first mobile body is last detected by the environment recognition device, a collision between the first mobile body and the vehicle to assist, based on the first behavior data acquired before the time point, and the second behavior data acquired from the communication means of the second mobile body; and execute a collision avoidance process, based on the predicted collision between the first mobile body and the vehicle to assist, control a steering angle or a brake operation amount of the vehicle to assist, and wherein the second mobile body is configured to send information on an own surrounding sound directly or via the external server to the vehicle to assist, and wherein the one or more processors are configured to determine the first mobile body approaching the second mobile body and the first mobile body passing by the second mobile body based on the surrounding sound.

2. The driver assistance system according to claim 1, wherein the one or more processors are configured to predict, when it is determined based on the second behavior data of the second mobile body that traveling of the first mobile body will be hindered by the second mobile body, a collision between the first mobile body and the vehicle to assist, assuming that the first mobile body will undergo deceleration.

3. The driver assistance system according to claim 2, wherein the one or more processors are configured to determine that the traveling of the first mobile body will be hindered by the second mobile body when it is predicted that the second mobile body will enter an area that the first mobile body is going to pass through at same time as estimated time of passing of the first mobile body.

4. The driver assistance system according to claim 2, wherein the one or more processors are configured to predict the collision between the first mobile body and the vehicle to assist, assuming that the first mobile body will recover a speed detected before the deceleration after second time when the first mobile body is estimated to overtake the second mobile body.

5. A driver assistance system that assists driving of a vehicle, the driver assistance system comprising:

one or more processors; and one or more memories communicably coupled to the one or more processors, wherein the one or more processors are configured to:

acquire first behavior data directly or via an external server from an environment recognition device, the first behavior data comprising behavior data of a first mobile body detected by the environment recognition device provided separately from the first mobile body, the first mobile body being different from the vehicle to assist;

acquire second behavior data, the second behavior data comprising behavior data of a second mobile body, the second mobile body being present in a traveling direction of the first mobile body and comprising a communication means for sending the second behavior data directly or via the external server to the vehicle to assist; and predict, when the first mobile body having been detected by the environment recognition device is no longer detected by the environment recognition device after a time point at which the first mobile body is last detected by the environment recognition device, a collision between the first mobile body and the vehicle to assist, based on the first behavior data acquired before the time point, and the second behavior data acquired from the communication means of the second mobile body; and execute a collision avoidance process, based on the predicted collision between the first mobile body and the vehicle to assist, control a steering angle or a brake operation amount of the vehicle to assist, wherein the second mobile body is configured to send own biological information detected by a biological sensor directly or via the external server to the vehicle to assist, and wherein the one or more processors are configured to determine whether the first mobile body is present around the second mobile body based on the biological information.

6. A non-transitory tangible recording medium recording a computer program to be applied to a driver assistance system configured to assist driving of a vehicle, the computer program causing one or more processors to execute a process, the process comprising:

acquiring first behavior data directly or via an external server from an environment recognition device, the first behavior data comprising behavior data of a first mobile body detected by the environment recognition device provided separately from the first mobile body, the first mobile body being different from the vehicle to assist;

acquiring second behavior data, the second behavior data comprising behavior data of a second mobile body, the second mobile body being present in a traveling direction of the first mobile body and comprising a communication means for sending the second behavior data directly or via the external server to a vehicle to assist;

predicting, when the first mobile body having been detected by the environment recognition device is no longer detected by the environment recognition device after a time point at which the first mobile body is last detected by the environment recognition device, a collision between the first mobile body and the vehicle to assist, based on the first behavior data acquired before the time point, and the second behavior data acquired from the communication means of the second mobile body; and executing a collision avoidance process, based on the predicted collision between the first mobile body and the vehicle to assist, control a steering angle or a brake operation amount of the vehicle to assist, wherein the second mobile body is configured to send information on an own surrounding sound directly or via the external server to the vehicle to assist, and the process further comprises determining the first mobile body approaching the second mobile body and the first mobile body passing by the second mobile body based on the surrounding sound.

7. The driver assistance system according to claim 5, wherein the one or more processors are configured to predict, when it is determined based on the second behavior data of the second mobile body that traveling of the first mobile body will be hindered by the second mobile body, a collision between the first mobile body and the vehicle to assist, assuming that the first mobile body will undergo deceleration.

8. The driver assistance system according to claim 5, wherein the one or more processors are configured to determine that the traveling of the first mobile body will be hindered by the second mobile body when it is predicted that the second mobile body will enter an area that the first mobile body is going to pass through at same time as estimated time of passing of the first mobile body.

9. The driver assistance system according to claim 7, wherein the one or more processors are configured to predict the collision between the first mobile body and the vehicle to assist, assuming that the first mobile body will recover a speed detected before the deceleration after second time when the first mobile body is estimated to overtake the second mobile body.

10. The non-transitory tangible recording medium according to claim 6, wherein the process further comprises predicting, when it is determined based on the second behavior data of the second mobile body that traveling of the first mobile body will be hindered by the second mobile body, a collision between the first mobile body and the vehicle to assist, assuming that the first mobile body will undergo deceleration.

11. The non-transitory tangible recording medium according to claim 6, wherein the process further comprises determining that the traveling of the first mobile body will be hindered by the second mobile body when it is predicted that the second mobile body will enter an area that the first mobile body is going to pass through at same time as estimated time of passing of the first mobile body.

12. The non-transitory tangible recording medium according to claim 10, wherein the processor further comprises predicting the collision between the first mobile body and the vehicle to assist, assuming that the first mobile body will recover a speed detected before the deceleration after second time when the first mobile body is estimated to overtake the second mobile body.

* * * * *